(12) United States Patent
Noh et al.

(10) Patent No.: US 10,320,544 B2
(45) Date of Patent: *Jun. 11, 2019

(54) METHOD AND APPARATUS FOR TRANSMITTING A REFERENCE SIGNAL IN A MULTI-ANTENNA SYSTEM

(71) Applicant: LG ELECTRONICS INC., Seoul (KR)

(72) Inventors: Min Seok Noh, Anyang-si (KR); Hyun Soo Ko, Anyang-si (KR); Seung Hee Han, Anyang-si (KR); Jae Hoon Chung, Anyang-si (KR); Moon Il Lee, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/913,491

(22) Filed: Mar. 6, 2018

(65) Prior Publication Data

US 2018/0198587 A1 Jul. 12, 2018

Related U.S. Application Data

(63) Continuation of application No. 15/412,761, filed on Jan. 23, 2017, now Pat. No. 10,033,498, which is a
(Continued)

(30) Foreign Application Priority Data

Sep. 16, 2010 (KR) .................. 10-2010-0091228

(51) Int. Cl.
*H04W 4/00* (2018.01)
*H04L 5/00* (2006.01)
(Continued)

(52) U.S. Cl.
CPC .......... *H04L 5/0048* (2013.01); *H04L 5/0023* (2013.01); *H04L 27/2605* (2013.01);
(Continued)

(58) Field of Classification Search
CPC .............. H04B 7/0613; H04L 27/2605; H04L 27/2613; H04L 27/2633; H04L 27/2636;
(Continued)

(56) References Cited

U.S. PATENT DOCUMENTS 6,728,233 B1 4/2004 Park et al.
8,902,849 B2 12/2014 Noh et al.
(Continued)

FOREIGN PATENT DOCUMENTS

| CN | 101309134 A | 11/2008 |
|---|---|---|
| WO | WO 2008/132073 A1 | 11/2008 |
| WO | WO 2010/097121 A1 | 9/2010 |

OTHER PUBLICATIONS

3GPP, "LTE; Evolved Universal Terrestrial Radio Access (E-UTRA); Physical layer procedures (3GPP TS 36.213 version 8.8.0 Release 8)", Technical Specification, ETSI TS 136 213 V8.8.0 (Oct. 2009), pp. 1-78.
(Continued)

*Primary Examiner* — Minh Trang T Nguyen
(74) *Attorney, Agent, or Firm* — Birch, Stewart, Kolasch & Birch, LLP

(57) ABSTRACT

A method for transmitting a demodulation reference signal (DM-RS), by a user equipment (UE), in a wireless communication system is discussed. The method includes receiving, by the UE from a base station, a cyclic shift field in downlink control information (DCI), wherein the cyclic shift field indicates first, second, and third cyclic shift values for first, second, and third layers respectively, generating, by the UE, first, second, and third DMRSs for the first, second, and third
(Continued)

layers respectively, based on first, second, and third cyclic shifts respectively, wherein the first, second, and third cyclic shifts are determined based on the first, second, and third cyclic shift values respectively, and transmitting, by the UE to the base station, the first, second, and third DMRSs.

2 Claims, 14 Drawing Sheets

Related U.S. Application Data continuation of application No. 14/968,304, filed on Dec. 14, 2015, now Pat. No. 9,578,637, which is a continuation of application No. 14/524,833, filed on Oct. 27, 2014, now Pat. No. 9,236,988, which is a continuation of application No. 13/496,365, filed as application No. PCT/KR2010/006360 on Sep. 16, 2010, now Pat. No. 8,902,849.

(60) Provisional application No. 61/293,203, filed on Jan. 8, 2010, provisional application No. 61/242,810, filed on Sep. 16, 2009.

(51) Int. Cl.
    *H04L 27/26* (2006.01)
    *H04W 72/04* (2009.01)
    *H04B 7/06* (2006.01)
    *H04W 88/06* (2009.01)

(52) U.S. Cl.
    CPC ...... *H04L 27/2613* (2013.01); *H04L 27/2633* (2013.01); *H04L 27/2636* (2013.01); *H04L 27/2637* (2013.01); *H04W 72/042* (2013.01); *H04W 72/0446* (2013.01); *H04B 7/0613* (2013.01); *H04W 88/06* (2013.01)

(58) Field of Classification Search
    CPC . H04L 27/2637; H04L 5/0023; H04L 5/0048; H04W 72/042; H04W 72/0446; H04W 88/06
    See application file for complete search history.

(56) References Cited

U.S. PATENT DOCUMENTS

| | | |
|---|---|---|
| 9,236,988 B2 | 1/2016 | Noh et al. |
| 9,578,637 B2 * | 2/2017 | Noh .................. H04L 5/0023 |
| 10,033,498 B2 * | 7/2018 | Noh .................. H04L 5/0023 |
| 2007/0253465 A1 | 11/2007 | Muharemovic et al. |
| 2009/0196370 A1 | 8/2009 | Cheng et al. |
| 2011/0243066 A1 | 10/2011 | Nayeb Nazar et al. |
| 2013/0308588 A1 | 11/2013 | Jongren et al. |

OTHER PUBLICATIONS

3GPP, "Technical Specification Group Radio Access Network; Evolved Universal Terrestrial Radio Access (E-UTRA); Physical layer procedures (Release 8)", 3GPP TS 36.213, V8.8.0, Sep. 2009, pp. 1-81.

ETRI, "PHICH Resource Identification for Extended CP," 3GPP TSG RAN WG1, Meeting #55, Agenda Item 6.1 Corrections for TS 36.211, R1-084530, Nov. 10-14, 2008, Prague, Czech Rep., 5 pages.

LG Electronics Inc., "Consideration on DMRS Design for UL SU-MIMO in LTE," 3GG TSG RAN WG1, Meeting #56bis, Agenda Item 15.5, R1-091214, Mar. 23-27, 2009, Seoul, Republic of Korea, 5 pages.

LG Electronics, "Consideration on DMRS design for UL SU-MIMO in LTE-A", 3GPP TSG RAN WG1 Meeting #57bis, R1-092514, Jun. 29-Jul. 3, 2009, pp. 1-4.

Motorola et al., "Clarification on PUSCH DM RS Cyclic Shift Hopping", 3GPP TSG-RAN WG1 Meeting #54, R1-083927, Sep. 29-Oct. 3, 2008, 2 pages provided.

Nokia Siemens Networks, "Reference Signal Structure for LTE-Advanced UL SU-MIMO", 3GPP TSG RAN WG1 Meeting #57, R1-091772, May 4-8, 2009, 6 pages provided.

Qualcomm Europe, "Flexible Data and Reference Multiplexing for LTE-Advanced Uplink", 3GPP TSG RAN WG1 #55bis, R1-090364, Jan. 12-16, 2009, 7 pages provided.

Texas Instruments, "Discussion on UL DM RS for SU-MIMO", 3GPP TSG RAN WG1 #57, R1-091843, May 4-8, 2009, pp. 1-3.

Y. Ogawa, et al., "Pilot Signal Generation Scheme using Frequency Dependent Cyclic Shift Sequence for Inter-cell Interference Mitigation" 2009 IEEE Radio and Wireless Symposium, pp. 421-424, Jan. 22, 2009.

3GPP, "Technical Specification Group Radio Access Network; Evolved Universal Terrestrial Radio Access (E-UTRA); Multiplexing and Channel Coding (Release 8)," 3GPP TS 36.212, V8.7.0, May 2009, pp. 1-60.

3GPP, "Technical Specification Group Radio Access Network; Evolved Universal Terrestrial Radio Access (E-UTRA); Physical Channels and Modulation (Release 8)," 3GPP TS 36.211, V8.7.0, May 2009, pp. 1-83.

* cited by examiner

FIG. 9
(a) 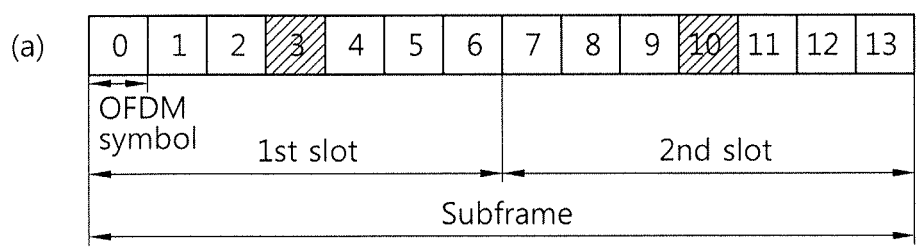
(b) 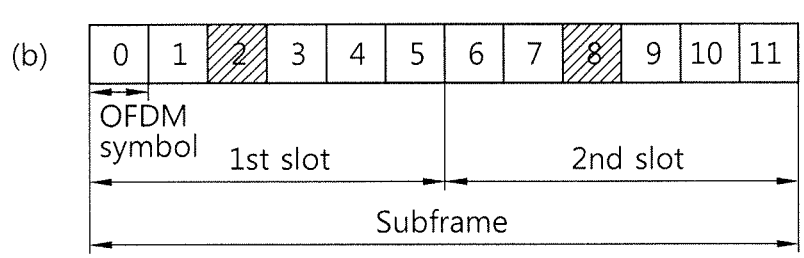

METHOD AND APPARATUS FOR TRANSMITTING A REFERENCE SIGNAL IN A MULTI-ANTENNA SYSTEM

CROSS-REFERENCE TO RELATED APPLICATIONS

This Application is a Continuation of U.S. patent application Ser. No. 15/412,761 filed on Jan. 23, 2017 (now U.S. Pat. No. 10,033,498 issued on Jul. 24, 2018), which is a Continuation of U.S. patent application Ser. No. 14/968,304 filed on Dec. 14, 2015 (now U.S. Pat. No. 9,578,637 issued on Feb. 21, 2017), which is a Continuation of U.S. patent application Ser. No. 14/524,833 filed on Oct. 27, 2014 (now U.S. Pat. No. 9,236,988 issued on Jan. 12, 2016), which is a Continuation of U.S. patent application Ser. No. 13/496,365 filed on Jun. 20, 2012 (now U.S. Pat. No. 8,902,849 issued on Dec. 2, 2014), which is the National Phase of PCT International Application No. PCT/KR2010/006360 filed on Sep. 16, 2010, which claims the priority benefit under 35 U.S.C. § 119(e) to U.S. Provisional Application Nos. 61/293,203 filed on Jan. 8, 2010 and 61/242,810 filed on Sep. 16, 2009, and under 35 U.S.C. § 119(a) to Korean Patent Application No. 10-2010-0091228 filed in the Republic of Korea on Sep. 16, 2010, all of which are hereby expressly incorporated by reference into the present application.

BACKGROUND OF THE INVENTION

The present invention relates to wireless communications, and more particularly, to a method and apparatus for transmitting a reference signal in a multi-antenna system.

Effective transmission/reception methods and utilizations have been proposed for a broadband wireless communication system to maximize efficiency of radio resources. An orthogonal frequency division multiplexing (OFDM) system capable of reducing inter-symbol interference (ISI) with a low complexity is taken into consideration as one of next generation wireless communication systems. In the OFDM, a serially input data symbol is converted into N parallel data symbols, and is then transmitted by being carried on each of separated N subcarriers. The subcarriers maintain orthogonality in a frequency dimension. Each orthogonal channel experiences mutually independent frequency selective fading, and an interval of a transmitted symbol is increased, thereby minimizing inter-symbol interference.

When a system uses the OFDM as a modulation scheme, orthogonal frequency division multiple access (OFDMA) is a multiple access scheme in which multiple access is achieved by independently providing some of available subcarriers to a plurality of users. In the OFDMA, frequency resources (i.e., subcarriers) are provided to the respective users, and the respective frequency resources do not overlap with one another in general since they are independently provided to the plurality of users. Consequently, the frequency resources are allocated to the respective users in a mutually exclusive manner. In an OFDMA system, frequency diversity for multiple users can be obtained by using frequency selective scheduling, and subcarriers can be allocated variously according to a permutation rule for the subcarriers. In addition, a spatial multiplexing scheme using multiple antennas can be used to increase efficiency of a spatial domain.

MIMO technology can be used to improve the efficiency of data transmission and reception using multiple transmission antennas and multiple reception antennas. MIMO technology may include a space frequency block code (SFBC), a space time block code (STBC), a cyclic delay diversity (CDD), a frequency switched transmit diversity (FSTD), a time switched transmit diversity (TSTD), a precoding vector switching (PVS), spatial multiplexing (SM) for implementing diversity. An MIMO channel matrix according to the number of reception antennas and the number of transmission antennas can be decomposed into a number of independent channels. Each of the independent channels is called a layer or stream. The number of layers is called a rank.

In wireless communication systems, it is necessary to estimate an uplink channel or a downlink channel for the purpose of the transmission and reception of data, the acquisition of system synchronization, and the feedback of channel information. In wireless communication system environments, fading is generated because of multi-path time latency. A process of restoring a transmit signal by compensating for the distortion of the signal resulting from a sudden change in the environment due to such fading is referred to as channel estimation. It is also necessary to measure the state of a channel for a cell to which a user equipment belongs or other cells. To estimate a channel or measure the state of a channel, a reference signal (RS) which is known to both a transmitter and a receiver can be used.

A subcarrier used to transmit the reference signal is referred to as a reference signal subcarrier, and a subcarrier used to transmit data is referred to as a data subcarrier. In an OFDM system, a method of assigning the reference signal includes a method of assigning the reference signal to all the subcarriers and a method of assigning the reference signal between data subcarriers. The method of assigning the reference signal to all the subcarriers is performed using a signal including only the reference signal, such as a preamble signal, in order to obtain the throughput of channel estimation. If this method is used, the performance of channel estimation can be improved as compared with the method of assigning the reference signal between data subcarriers because the density of reference signals is in general high. However, since the amount of transmitted data is small in the method of assigning the reference signal to all the subcarriers, the method of assigning the reference signal between data subcarriers is used in order to increase the amount of transmitted data. If the method of assigning the reference signal between data subcarriers is used, the performance of channel estimation can be deteriorated because the density of reference signals is low. Accordingly, the reference signals should be properly arranged in order to minimize such deterioration.

A receiver can estimate a channel by separating information about a reference signal from a received signal because it knows the information about a reference signal and can accurately estimate data, transmitted by a transmit stage, by compensating for an estimated channel value. Assuming that the reference signal transmitted by the transmitter is p, channel information experienced by the reference signal during transmission is h, thermal noise occurring in the receiver is n, and the signal received by the receiver is y, it can result in y=h·p+n. Here, since the receiver already knows the reference signal p, it can estimate a channel information value $\hat{h}$ using Equation 1 in the case in which a least square (LS) method is used.

$$\hat{h} = y/p = h + n/p = h + \hat{n} \qquad \text{[Equation 1]}$$

The accuracy of the channel estimation value $\hat{h}$ estimated using the reference signal p is determined by the value $\hat{n}$. To accurately estimate the value h, the value $\hat{n}$ must converge on 0. To this end, the influence of the value ñ has to be minimized by estimating a channel using a large number of reference signals. A variety of algorithms for a better channel estimation performance may exist.

Meanwhile, a reference signal transmission method supporting a MIMO system using a plurality of antennas in uplink transmission and its related method of allocating a cyclic shift value of a reference signal sequence have not been proposed up to now in the 3GPP LTE system. Therefore, there is a need for a reference signal transmission method which guarantees channel estimation capability in the MIMO system.

SUMMARY OF THE INVENTION

The present invention provides a method and apparatus for transmitting a reference signal in a multi-antenna system.

In an aspect, a method of transmitting a reference signal in a multi-antenna system is provided. The method includes generating a plurality of reference signal sequences in which different cyclic shift values are allocated respectively to a plurality of layers, generating a single carrier-frequency division multiple access (SC-FDMA) symbol to which the plurality of reference signal sequences are mapped, and transmitting the SC-FDMA symbol to a base station through a plurality of antennas, wherein the cyclic shift values allocated to the respective layers are determined by a first cyclic shift value which is a cyclic shift value allocated to a first layer among the plurality of layers and different cyclic shift offsets allocated to the respective layers. The first cyclic shift value and a second cyclic shift value which is a cyclic shift value allocated to a second layer among the plurality of layers may have a maximum interval. The number of the plurality of layers may be 3. A third cyclic shift offset which is a cyclic shift offset allocated to a third layer among the plurality of layers may be a median value of the first cyclic shift offset which is the cyclic shift offset allocated to the first layer among the plurality of layers and the second cyclic shift offset which is the cyclic shift offset allocated to the second layer. The first cyclic shift offset, the second cyclic shift offset, and the third cyclic shift offset may be respectively 0, 6, and 3. If the number of the plurality of layers is 4, a third cyclic shift value which is a cyclic shift value allocated to a third layer among the plurality of layers and a fourth cyclic shift value which is a cyclic shift value allocated to a fourth layer may have a maximum interval. The cyclic shift values of the reference signals for the plurality of layers may be indicated by a cyclic shift field in a downlink control information (DCI) format transmitted through a physical downlink control channel (PDCCH). The cyclic shift field may have a length of 3 bits. The plurality of reference signal sequences may be transmitted in two slots constituting a subframe. The plurality of reference signal sequences may be transmitted in a fourth SC-FDMA symbol of each slot in case of a normal cyclic prefix (CP), and the plurality of reference signal sequences may be transmitted in a third SC-FDMA symbol of each slot in case of an extended CP. An orthogonal covering code (OCC) may be applied to the reference signal sequences for the plurality of layers.

In another aspect, an apparatus for transmitting a reference signal is provided. The apparatus includes a reference signal generator configured for generating a plurality of reference signal sequences in which different cyclic shift values are allocated respectively to a plurality of layers, an SC-FDMA symbol generator configured for generating an SC-FDMA symbol to which the plurality of reference signal sequences are mapped, and a radio frequency (RF) unit configured for transmitting the SC-FDMA symbol to a base station through a plurality of antennas, wherein the cyclic shift values allocated to the respective layers are determined by a first cyclic shift value which is a cyclic shift value allocated to a first layer among the plurality of layers and different cyclic shift offsets allocated to the respective layers. The first cyclic shift value and a second cyclic shift value which is a cyclic shift value allocated to a second layer among the plurality of layers may have a maximum interval. A third cyclic shift offset which is a cyclic shift offset allocated to a third layer among the plurality of layers may be a median value of the first cyclic shift offset which is the cyclic shift offset allocated to the first layer among the plurality of layers and the second cyclic shift offset which is the cyclic shift offset allocated to the second layer. The first cyclic shift offset, the second cyclic shift offset, and the third cyclic shift offset may be respectively 0, 6, and 3.

By effectively allocating a cyclic shift value for a reference signal sequence, channel estimation capability can be guaranteed.

BRIEF DESCRIPTION OF THE DRAWINGS

FIG. 9, including (a) and (b), shows examples of a subframe through which a reference signal is transmitted.

DETAILED DESCRIPTION OF THE EMBODIMENTS

The following technique may be used for various wireless communication systems such as code division multiple access (CDMA), a frequency division multiple access (FDMA), time division multiple access (TDMA), orthogonal frequency division multiple access (OFDMA), single carrier-frequency division multiple access (SC-FDMA), and the like. The CDMA may be implemented as a radio technology such as universal terrestrial radio access (UTRA) or CDMA2000. The TDMA may be implemented as a radio technology such as a global system for mobile communications (GSM)/general packet radio service (GPRS)/enhanced data rates for GSM evolution (EDGE). The OFDMA may be implemented by a radio technology such as IEEE (Institute of Electrical and Electronics Engineers) 802.11 (Wi-Fi), IEEE 802.16 (WiMAX), IEEE 802.20, E-UTRA (Evolved UTRA), and the like. IEEE 802.16m, an evolution of IEEE 802.16e, provides backward compatibility with a system based on IEEE 802.16e. The UTRA is part of a universal mobile telecommunications system (UMTS). 3GPP (3rd generation partnership project) LTE (long term evolution) is part of an evolved UMTS (E-UMTS) using the E-UTRA, which employs the OFDMA in downlink and the SC-FDMA in uplink. LTE-A (advanced) is an evolution of 3GPP LTE.

Hereinafter, for clarification, LET-A will be largely described, but the technical concept of the present invention is not meant to be limited thereto.

Figure 1:
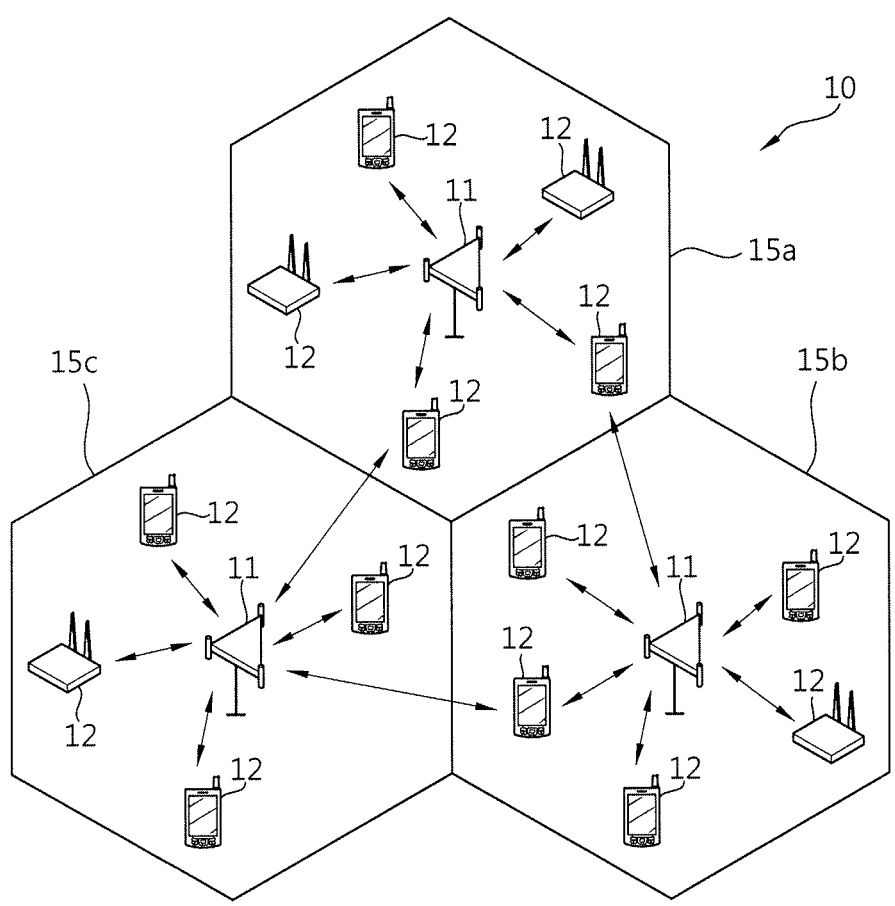
FIG. 1 shows a wireless communication system.

FIG. 1 shows a wireless communication system.

The wireless communication system 10 includes at least one base station (BS) 11. Respective BSs 11 provide a communication service to particular geographical areas 15a, 15b, and 15c (which are generally called cells). Each cell may be divided into a plurality of areas (which are called sectors). A user equipment (UE) 12 may be fixed or mobile and may be referred to by other names such as MS (mobile station), MT (mobile terminal), UT (user terminal), SS (subscriber station), wireless device, PDA (personal digital assistant), wireless modem, handheld device. The BS 11 generally refers to a fixed station that communicates with the UE 12 and may be called by other names such as eNB (evolved-NodeB), BTS (base transceiver system), access point (AP), etc.

In general, a UE belongs to one cell, and the cell to which a UE belongs is called a serving cell. ABS providing a communication service to the serving cell is called a serving BS. The wireless communication system is a cellular system, so a different cell adjacent to the serving cell exists. The different cell adjacent to the serving cell is called a neighbor cell. A BS providing a communication service to the neighbor cell is called a neighbor BS. The serving cell and the neighbor cell are relatively determined based on a UE.

This technique can be used for downlink or uplink. In general, downlink refers to communication from the BS 11 to the UE 12, and uplink refers to communication from the UE 12 to the BS 11. In downlink, a transmitter may be part of the BS 11 and a receiver may be part of the UE 12. In uplink, a transmitter may be part of the UE 12 and a receiver may be part of the BS 11.

The wireless communication system may be any one of a multiple-input multiple-output (MIMO) system, a multiple-input single-output (MISO) system, a single-input single-output (SISO) system, and a single-input multiple-output (SIMO) system. The MIMO system uses a plurality of transmission antennas and a plurality of reception antennas. The MISO system uses a plurality of transmission antennas and a single reception antenna. The SISO system uses a single transmission antenna and a single reception antenna. The SIMO system uses a single transmission antenna and a plurality of reception antennas.

Hereinafter, a transmission antenna refers to a physical or logical antenna used for transmitting a signal or a stream, and a reception antenna refers to a physical or logical antenna used for receiving a signal or a stream.

Figure 2:
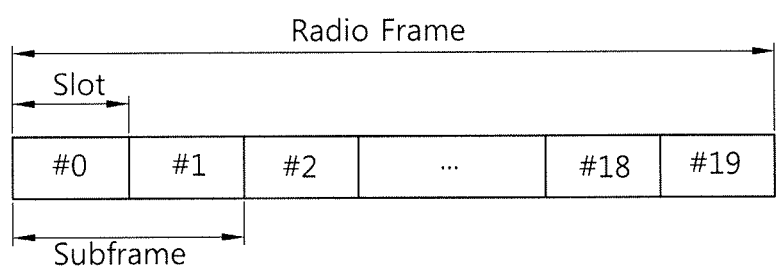
FIG. 2 shows the structure of a radio frame in 3GPP LTE.

FIG. 2 shows the structure of a radio frame in 3GPP LTE. It may be referred to Paragraph 5 of "Technical Specification Group Radio Access Network; Evolved Universal Terrestrial Radio Access (E-UTRA); Physical channels and modulation (Release 8)" to 3GPP (3rd generation partnership project) TS 36.211 V8.2.0 (2008-03).

Referring to FIG. 2, the radio frame includes 10 subframes, and one subframe includes two slots. The slots in the radio frame are numbered by #0 to #19. A time taken for transmitting one subframe is called a transmission time interval (TTI). The TTI may be a scheduling unit for a data transmission. For example, a radio frame may have a length of 10 ms, a subframe may have a length of 1 ms, and a slot may have a length of 0.5 ms.

One slot includes a plurality of OFDM (Orthogonal Frequency Division Multiplexing) symbols in a time domain and a plurality of subcarriers in a frequency domain. Since 3GPP LTE uses OFDMA in downlink, the OFDM symbols are used to express a symbol period. The OFDM symbols may be called by other names depending on a multiple-access scheme. For example, when SC-FDMA is in use as an uplink multi-access scheme, the OFDM symbols may be called SC-FDMA symbols. A resource block (RB), a resource allocation unit, includes a plurality of continuous subcarriers in a slot. The structure of the radio frame is merely an example. Namely, the number of subframes included in a radio frame, the number of slots included in a subframe, or the number of OFDM symbols included in a slot may vary.

3GPP LTE defines that one slot includes seven OFDM symbols in a normal cyclic prefix (CP) and one slot includes six OFDM symbols in an extended CP.

Figure 3:
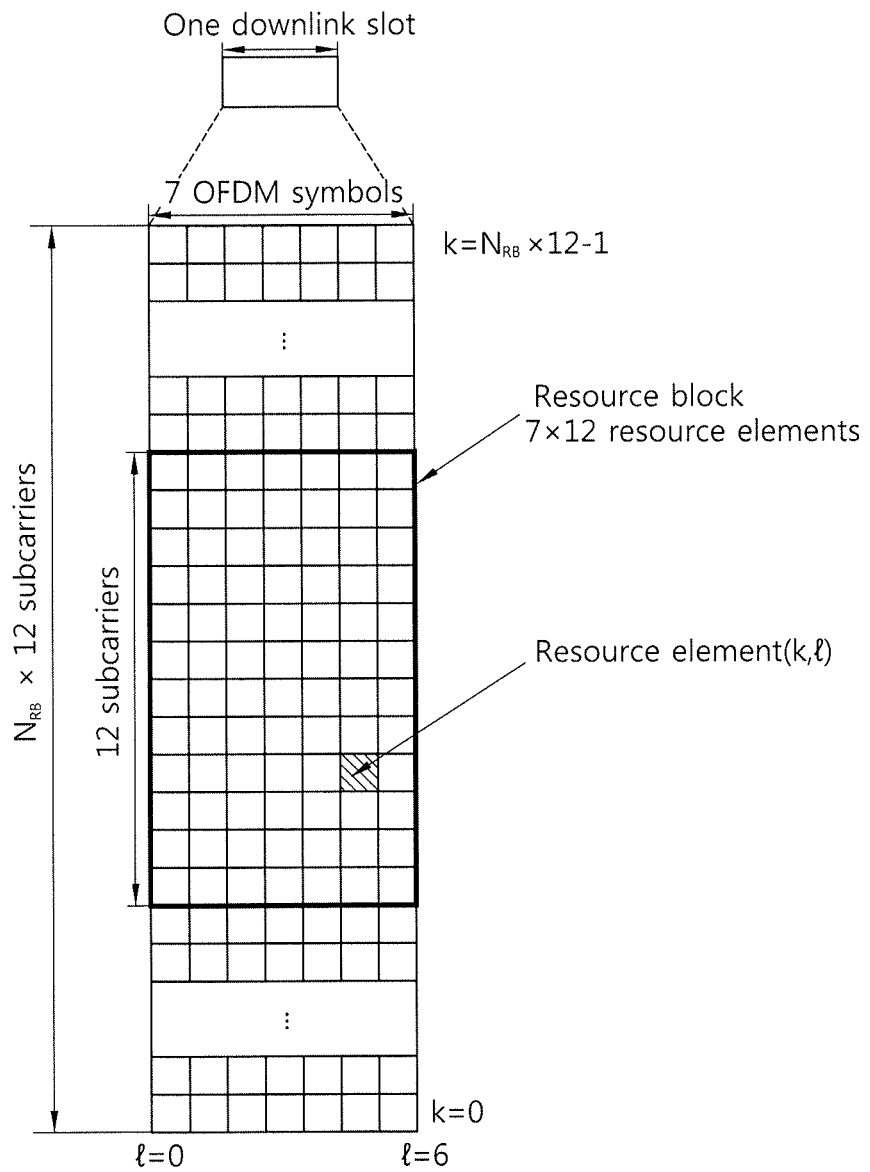
FIG. 3 shows an example of a resource grid of a single downlink slot.

FIG. 3 shows an example of a resource grid of a single downlink slot.

A downlink slot includes a plurality of OFDM symbols in the time domain and NRB number of resource blocks (RBs) in the frequency domain. The NRB number of resource blocks included in the downlink slot is dependent upon a downlink transmission bandwidth set in a cell. For example, in an LTE system, NRB may be any one of 60 to 110. One resource block includes a plurality of subcarriers in the frequency domain. An uplink slot may have the same structure as that of the downlink slot.

Each element on the resource grid is called a resource element. The resource elements on the resource grid can be discriminated by a pair of indexes (k,l) in the slot. Here, k (k=0, . . . , NRB×12−1) is a subcarrier index in the frequency domain, and l is an OFDM symbol index in the time domain.

Here, it is illustrated that one resource block includes 7×12 resource elements made up of seven OFDM symbols in the time domain and twelve subcarriers in the frequency domain, but the number of OFDM symbols and the number of subcarriers in the resource block are not limited thereto. The number of OFDM symbols and the number of subcarriers may vary depending on the length of a cyclic prefix (CP), frequency spacing, and the like. For example, in case of a normal CP, the number of OFDM symbols is 7, and in case of an extended CP, the number of OFDM symbols is 6. One of 128, 256, 512, 1024, 1536, and 2048 may be selectively used as the number of subcarriers in one OFDM symbol.

Figure 4:
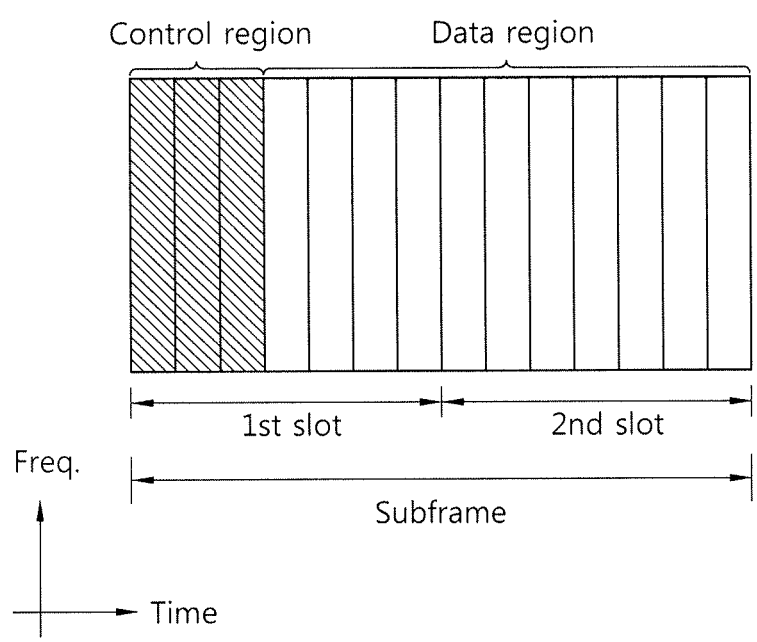
FIG. 4 shows the structure of a downlink subframe.

FIG. 4 shows the structure of a downlink subframe.

A downlink subframe includes two slots in the time domain, and each of the slots includes seven OFDM symbols in the normal CP. First three OFDM symbols (maximum four OFDM symbols with respect to a 1.4 MHz bandwidth) of a first slot in the subframe corresponds to a control region to which control channels are allocated, and the other remaining OFDM symbols correspond to a data region to which a physical downlink shared channel (PDSCH) is allocated.

The PDCCH may carry a transmission format and a resource allocation of a downlink shared channel (DL-SCH), resource allocation information of an uplink shared channel (UL-SCH), paging information on a PCH, system information on a DL-SCH, a resource allocation of an higher layer control message such as a random access response transmitted via a PDSCH, a set of transmission power control commands with respect to individual UEs in a certain UE group, an activation of a voice over internet protocol (VoIP), and the like. A plurality of PDCCHs may be transmitted in the control region, and a UE can monitor a plurality of PDCCHs. The PDCCHs are transmitted on one or an aggregation of a plurality of consecutive control channel elements (CCE). The CCE is a logical allocation unit used to provide a coding rate according to the state of a wireless channel. The CCD corresponds to a plurality of resource element groups. The format of the PDCCH and an available number of bits of the PDCCH are determined according to an associative relation between the number of the CCEs and a coding rate provided by the CCEs.

The BS determines a PDCCH format according to a DCI to be transmitted to the UE, and attaches a cyclic redundancy check (CRC) to the DCI. A unique radio network temporary identifier (RNTI) is masked on the CRC according to the owner or the purpose of the PDCCH. In case of a PDCCH for a particular UE, a unique identifier, e.g., a cell-RNTI (C-RNTI), of the UE, may be masked on the CRC. Or, in case of a PDCCH for a paging message, a paging indication identifier, e.g., a paging-RNTI (P-RNTI), may be masked on the CRC. In case of a PDCCH for a system information block (SIB), a system information identifier, e.g., a system information-RNTI (SI-RNTI), may be masked on the CRC. In order to indicate a random access response, i.e., a response to a transmission of a random access preamble of the UE, a random access-RNTI (RA-RNTI) may be masked on the CRC.

Figure 5:
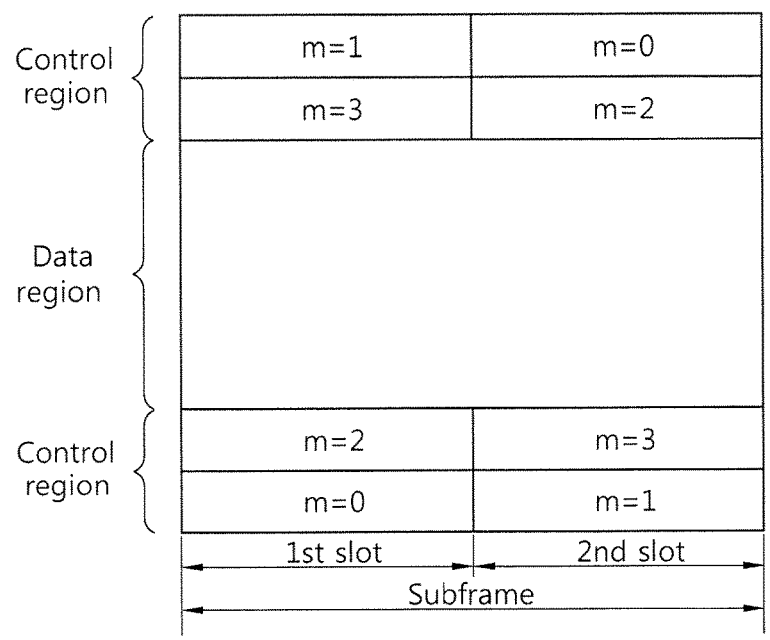
FIG. 5 shows the structure of an uplink subframe.

FIG. 5 shows the structure of an uplink subframe.

An uplink subframe may be divided into a control region and a data region in the frequency domain. A physical uplink control channel (PUCCH) for transmitting uplink control information is allocated to the control region. A physical uplink shared channel (PUCCH) for transmitting data is allocated to the data region. The user equipment does not transmit the PUCCH and the PUSCH simultaneously to maintain a single carrier property.

The PUCCH with respect to a UE is allocated by a pair of resource blocks in a subframe. The resource blocks belonging to the pair of resource blocks (RBs) occupy different subcarriers in first and second slots, respectively. The frequency occupied by the RBs belonging to the pair of RBs is changed based on a slot boundary. This is said that the pair of RBs allocated to the PUCCH are frequency-hopped at the slot boundary. The UE can obtain a frequency diversity gain by transmitting uplink control information through different subcarriers according to time. In FIG. 5, m is a position index indicating the logical frequency domain positions of the pair of RBs allocated to the PUCCH in the subframe.

Uplink control information transmitted on the PUCCH may include a hybrid automatic repeat request (HARQ) acknowledgement/non-acknowledgement (ACK/NACK), a channel quality indicator (CQI) indicating the state of a downlink channel, a scheduling request (SR), and the like.

The PUSCH is mapped to a uplink shared channel (UL-SCH), a transport channel. Uplink data transmitted on the PUSCH may be a transport block, a data block for the UL-SCH transmitted during the TTI. The transport block may be user information. Or, the uplink data may be multiplexed data. The multiplexed data may be data obtained by multiplexing the transport block for the UL-SCH and control information. For example, control information multiplexed to data may include a CQI, a precoding matrix indicator (PMI), an HARQ, a rank indicator (RI), or the like. Or the uplink data may include only control information.

Figure 6:
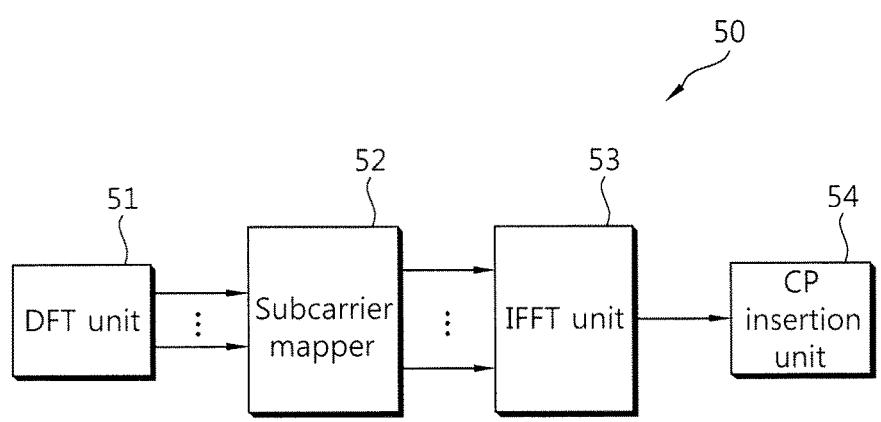
FIG. 6 shows an example of the structure of a transmitter in an SC-FDMA system.

FIG. 6 shows an example of the structure of a transmitter in an SC-FDMA system.

Referring to FIG. 6, the transmitter 50 includes a discrete Fourier transform (DFT) unit 51, a subcarrier mapper 52, an inverse fast Fourier transform (IFFT) unit 53, and a cyclic prefix (CP) insertion unit 54. The transmitter 50 may include a scramble unit (not shown), a modulation mapper (not shown), a layer mapper (not shown), and a layer permutator (not shown), which may be placed in front of the DFT unit 51.

The DFT unit 51 outputs complex-valued symbols by performing DFT on input symbols. For example, when Ntx symbols are input (where Ntx is a natural number), a DFT size is Ntx. The DFT unit 51 may be called a transform precoder. The subcarrier mapper 52 maps the complex-valued symbols to the respective subcarriers of the frequency domain. The complex-valued symbols may be mapped to resource elements corresponding to a resource block allocated for data transmission. The subcarrier mapper 52 may be called a resource element mapper. The IFFT unit 53 outputs a baseband signal for data (that is, a time domain signal) by performing IFFT on the input symbols. The CP insertion unit 54 copies some of the rear part of the baseband signal for data and inserts the copied parts into the former part of the baseband signal for data. Orthogonality may be maintained even in a multi-path channel because inter-symbol interference (ISI) and inter-carrier interference (ICI) are prevented through CP insertion.

Figure 7:
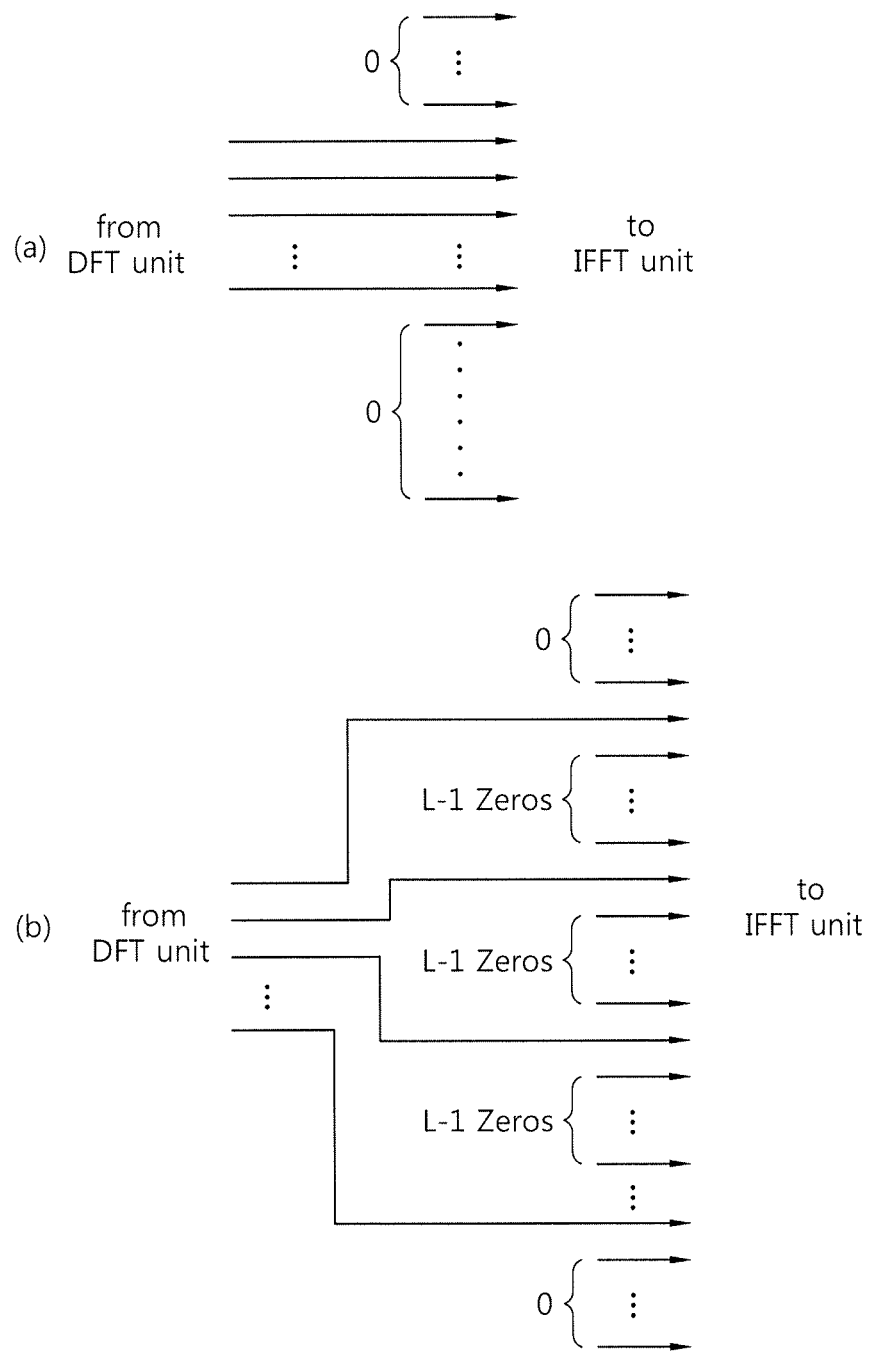
FIG. 7 shows an example of a scheme in which the subcarrier mapper maps the complex-valued symbols to the respective subcarriers of the frequency domain.

FIG. 7 shows an example of a scheme in which the subcarrier mapper maps the complex-valued symbols to the respective subcarriers of the frequency domain. Referring to FIG. 7(a), the subcarrier mapper maps the complex-valued symbols, outputted from the DFT unit, to subcarriers contiguous to each other in the frequency domain. '0' is inserted into subcarriers to which the complex-valued symbols are not mapped. This is called localized mapping. In a 3GPP LTE system, a localized mapping scheme is used. Referring to FIG. 7(b), the subcarrier mapper inserts an (L−1) number of '0' every two contiguous complex-valued symbols which are outputted from the DFT unit (L is a natural number). That is, the complex-valued symbols outputted from the DFT unit are mapped to subcarriers distributed at equal intervals in the frequency domain. This is called distributed mapping. If the subcarrier mapper uses the localized mapping scheme as in FIG. 7(a) or the distributed mapping scheme as in FIG. 7(b), a single carrier characteristic is maintained.

Figure 8:
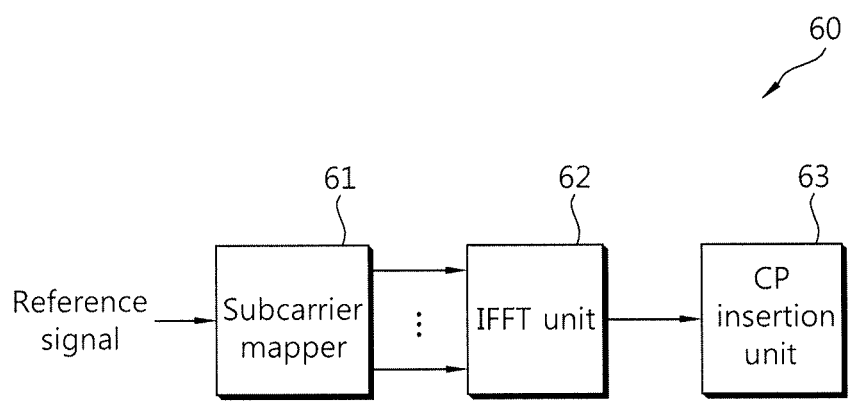
FIG. 8 shows an example of the structure of a reference signal transmitter for demodulation.

FIG. 8 shows an example of the structure of a reference signal transmitter for demodulation.

Referring to FIG. 8 the reference signal transmitter 60 includes a subcarrier mapper 61, an IFFT unit 62, and a CP insertion unit 63. Unlike the transmitter 50 of FIG. 6, in the reference signal transmitter 60, a reference signal is directly generated in the frequency domain without passing through the DFT unit 51 and then mapped to subcarriers through the subcarrier mapper 61. Here, the subcarrier mapper may map the reference signal to the subcarriers using the localized mapping scheme of FIG. 7(a).

FIG. 9, including (a) and (b), shows examples of a subframe through which a reference signal is transmitted. The structure of the subframe in FIG. 9(a) shows a case of a normal CP. The subframe includes a first slot and a second slot. Each of the first slot and the second slot includes 7 OFDM symbols. The 14 OFDM symbols within the subframe are assigned respective symbol indices 0 to 13. A reference signal may be transmitted through the OFDM symbols having the symbol indices 3 and 10. Data may be transmitted through the remaining OFDM symbols other than the OFDM symbols through which the reference signal is transmitted. The structure of a subframe in FIG. 9(b) shows a case of an extended CP. The subframe includes a first slot and a second slot. Each of the first slot and the second slot includes 6 OFDM symbols. The 12 OFDM symbols within the subframe are assigned symbol indices 0 to 11. A reference signal is transmitted through the OFDM symbols having the symbol indices 2 and 8. Data is transmitted through the remaining OFDM symbols other than the OFDM symbols through which the reference signal is transmitted.

Although not shown in FIG. 9, a sounding reference signal (SRS) may be transmitted through the OFDM symbols within the subframe. The SRS is a reference signal for UL scheduling which is transmitted from a UE to a BS. The BS estimates a UL channel through the received SRS and uses the estimated UL channel in UL scheduling.

A clustered DFT-s OFDM transmission scheme is a modification of the existing SC-FDMA transmission scheme and is a method of dividing data symbols, subjected to a precoder, into a plurality of subblocks, separating the subblocks, and mapping the subblocks in the frequency domain.

Figure 10:
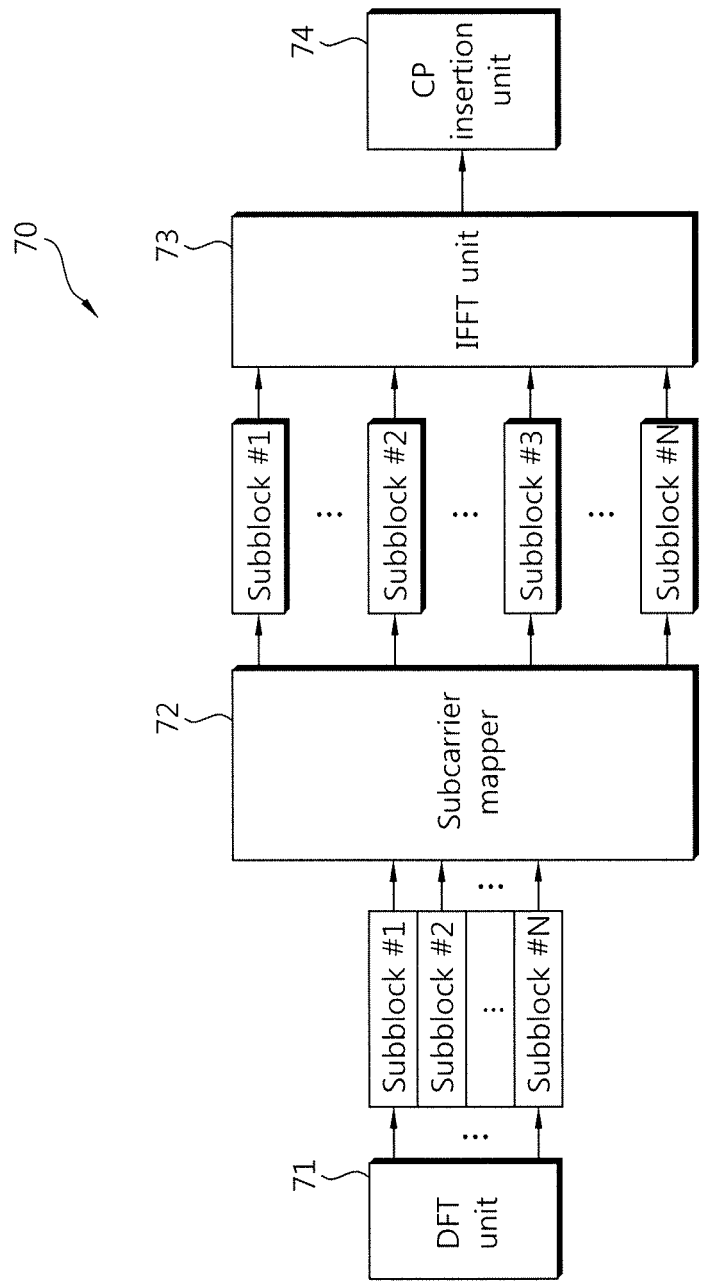
FIG. 10 shows an example of a transmitter using the clustered DFT-s OFDM transmission scheme.

FIG. 10 shows an example of a transmitter using the clustered DFT-s OFDM transmission scheme. Referring to FIG. 10, the transmitter 70 includes a DFT unit 71, a subcarrier mapper 72, an IFFT unit 73, and a CP insertion unit 74. The transmitter 70 may further include a scramble unit (not shown), a modulation mapper (not shown), a layer mapper (not shown), and a layer permutator (not shown), which may be placed in front of the DFT unit 71.

Complex-valued symbols outputted from the DFT unit 71 are divided into N subblocks (N is a natural number). The N subblocks may be represented by a subblock #1, a subblock #2, ..., a subblock #N. The subcarrier mapper 72 distributes the N subblocks in the frequency domain and maps the N subblocks to subcarriers. The NULL may be inserted every two contiguous subblocks. The complex-valued symbols within one subblock may be mapped to subcarriers contiguous to each other in the frequency domain. That is, the localized mapping scheme may be used within one subblock.

The transmitter 70 of FIG. 10 may be used both in a single carrier transmitter or a multi-carrier transmitter. If the transmitter 70 is used in the single carrier transmitter, all the N subblocks correspond to one carrier. If the transmitter 70 is used in the multi-carrier transmitter, each of the N subblocks may correspond to one carrier. Alternatively, even if the transmitter 70 is used in the multi-carrier transmitter, a plurality of subblocks of the N subblocks may correspond to one carrier. Meanwhile, in the transmitter 70 of FIG. 10, a time domain signal is generated through one IFFT unit 73. Accordingly, in order for the transmitter 70 of FIG. 10 to be used in a multi-carrier transmitter, subcarrier intervals between contiguous carriers in a contiguous carrier allocation situation must be aligned.

Figure 11:
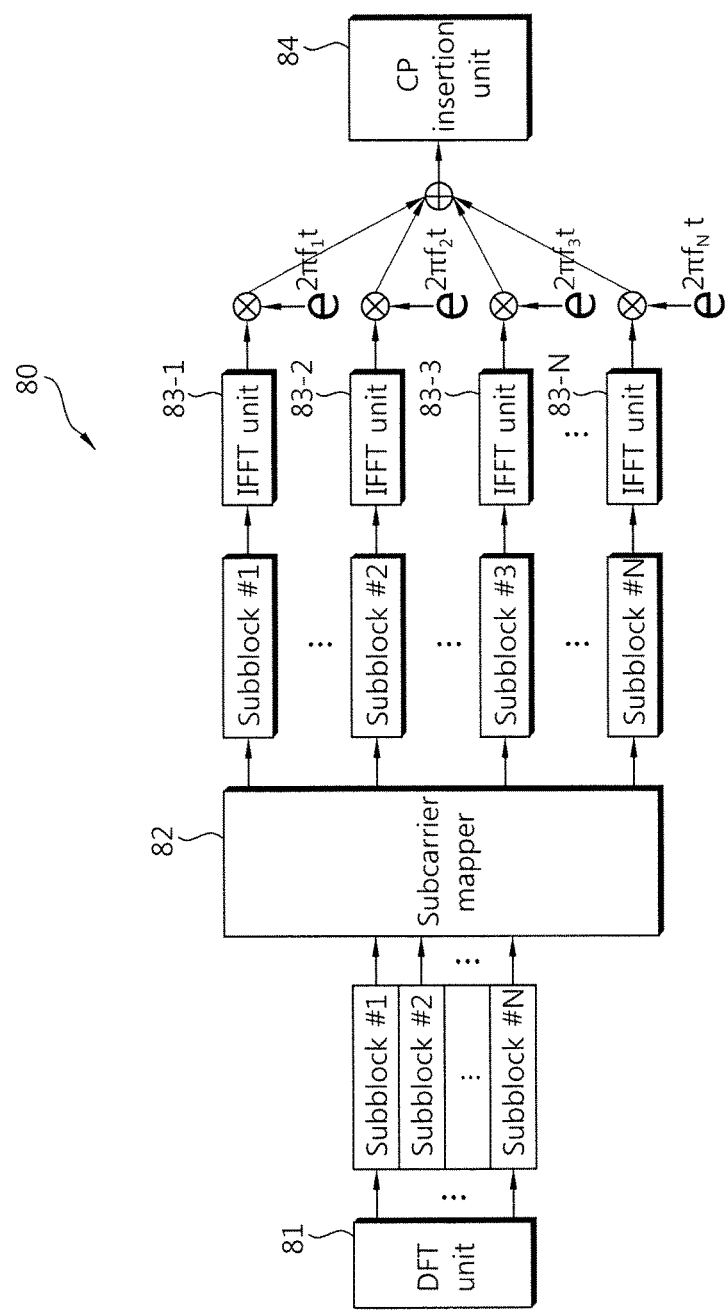
FIG. 11 shows another example of a transmitter using the clustered DFT-s OFDM transmission scheme.

FIG. 11 shows another example of a transmitter using the clustered DFT-s OFDM transmission scheme. Referring to FIG. 11, the transmitter 80 includes a DFT unit 81, a subcarrier mapper 82, a plurality of IFFT units 83-1, 83-2, ..., 83-N (N is a natural number), and a CP insertion unit 84. The transmitter 80 may further include a scramble unit (not shown), a modulation mapper (not shown), a layer mapper (not shown), and a layer permutator (not shown), which may be placed in front of the DFT unit 71.

IFFT is individually performed on each of N subblocks. An nth IFFT unit 83-$n$ outputs an nth baseband signal (n=1, 2, ..., N) by performing IFFT on a subblock #n. The nth baseband signal is multiplied by an nth carrier signal to produce an nth radio signal. After the N radio signals generated from the N subblocks are added, a CP is inserted by the CP insertion unit 84. The transmitter 80 of FIG. 11 may be used in a discontinuous carrier allocation situation where carriers allocated to the transmitter are not contiguous to each other.

Figure 12:
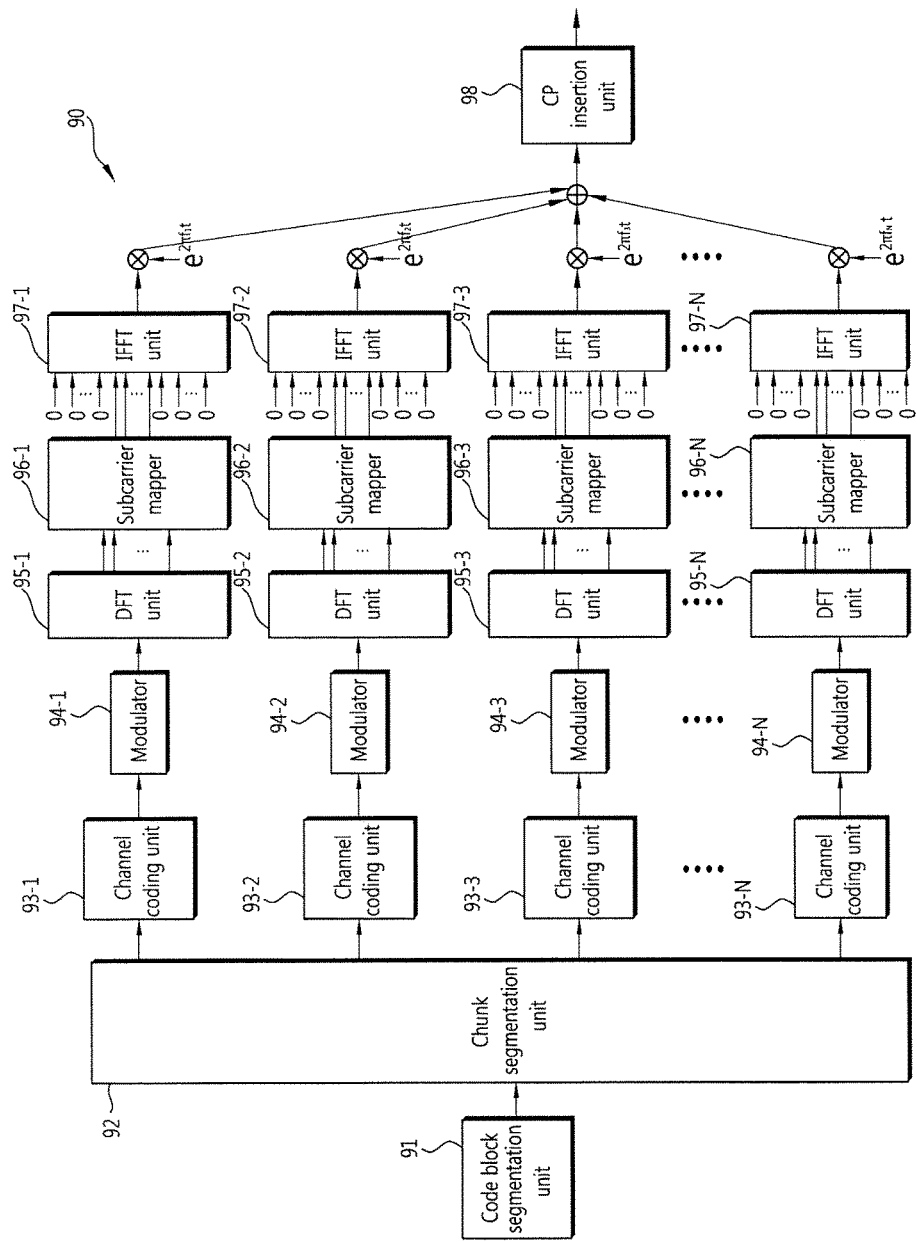
FIG. 12 is yet another example of a transmitter using the clustered DFT-s OFDM transmission scheme.

FIG. 12 is yet another example of a transmitter using the clustered DFT-s OFDM transmission scheme. FIG. 12 is a chunk-specific DFT-s OFDM system performing DFT precoding on a chunk basis. This may be called N×SC-FDMA. Referring to FIG. 12, the transmitter 90 includes a code block division unit 91, a chunk division unit 92, a plurality of channel coding units 93-1, ..., 93-N, a plurality of modulators 94-1, ..., 94-N, a plurality of DFT units 95-1, ..., 95-N, a plurality of subcarrier mappers 96-1, ..., 96-N, a plurality of IFFT units 97-1, ..., 97-N, and a CP insertion unit 98. Here, N may be the number of multiple carriers used by a multi-carrier transmitter. Each of the channel coding units 93-1, ..., 93-N may include a scramble unit (not shown). The modulators 94-1, ..., 94-N may also be called modulation mappers. The transmitter 90 may further include a layer mapper (not shown) and a layer permutator (not shown) which may be placed in front of the DFT units 95-1, ..., 95-N.

The code block division unit 91 divides a transmission block into a plurality of code blocks. The chunk division unit 92 divides the code blocks into a plurality of chunks. Here, the code block may be data transmitted by a multi-carrier transmitter, and the chunk may be a data piece transmitted through one of multiple carriers. The transmitter 90 performs DFT on a chunk basis. The transmitter 90 may be used in a discontinuous carrier allocation situation or a contiguous carrier allocation situation.

A UL reference signal is described below.

A reference signal is generally transmitted as a sequence. A reference signal sequence is not particularly limited and a certain sequence may be used as the reference signal sequence. As the reference signal sequence, a sequence generated through a computer based on phase shift keying (PSK) (i.e., a PSK-based computer generated sequence) may be used. The PSK may include, for example, binary phase shift keying (BPSK), quadrature phase shift keying (QPSK), and the like. Or, as the reference signal sequence, a constant amplitude zero auto-correlation (CAZAC) may be used. The CAZAC sequence may include, for example, a Zadoff-Chu (ZC)-based sequence, a ZC sequence with cyclic extension, a ZC sequence with truncation, and the like. Also, as the reference signal sequence, a pseudo-random (PN) sequence may be used. The PN sequence may include, for example, an m-sequence, a sequence generated through a computer, a gold sequence, a Kasami sequence, and the like. Also, a cyclically shifted sequence may be used as the reference signal sequence.

A UL reference signal may be divided into a demodulation reference signal (DMRS) and a sounding reference signal (SRS). The DMRS is a reference signal used in channel estimation for the demodulation of a received signal. The DMRS may be associated with the transmission of a PUSCH or PUCCH. The SRS is a reference signal transmitted from a UE to a BS for UL scheduling. The BS estimates an UL channel through the received SRS and uses the estimated UL channel in UL scheduling. The SRS is not associated with the transmission of a PUSCH or PUCCH. The same kind of a basic sequence may be used for the DMRS and the SRS. Meanwhile, in UL multi-antenna transmission, precoding applied to the DMRS may be the same as precoding applied to a PUSCH. Cyclic shift separation is a primary scheme for multiplexing the DMRS. In an LTE-A system, the SRS may not be precoded and may be an antenna-specific reference signal.

A reference signal sequence $r_{u,v}^{(\alpha)}(n)$ may be defined based on a basic sequence $b_{u,v}(n)$ and a cyclic shift $\alpha$ according to Equation 2.

$$r_{u,v}^{(\alpha)}(n)=e^{j\alpha n}b_{u,v}(n), 0 \leq n < M_{sc}^{RS} \quad \text{[Equation 2]}$$

In Equation 2, $M_{sc}^{RS}(1 \leq m \leq N_{RB}^{max,UL})$ is the length of the reference signal sequence and $M_{sc}^{RS}=m*Ns_c^{RB}$. $N_{sc}^{RB}$ is the size of a resource block indicated by the number of subcarriers in the frequency domain. $N_{RB}^{max,UL}$ indicates a maximum value of a UL bandwidth indicated by a multiple of $N_{sc}^{RB}$. A plurality of reference signal sequences may be defined by differently applying a cyclic shift value $\alpha$ from one basic sequence.

A basic sequence $b_{u,v}(n)$ is divided into a plurality of groups. Here, $u \in \{0, 1, \ldots, 29\}$ indicates a group index, and v indicates a basic sequence index within the group. The basic sequence depends on the length $M_{sc}^{RS}$ of the basic sequence. Each group includes a basic sequence (v=0) having a length of $M_{sc}^{RS}$ for m (1≤m≤5) and includes 2 basic sequences (v=0,1) having a length of $M_{sc}^{RS}$ for m (6≤m≤$n_{RB}^{max,UL}$). The sequence group index u and the basic sequence index v within a group may vary according to time as in group hopping or sequence hopping.

Furthermore, if the length of the reference signal sequence is $3N_{sc}^{RB}$ or higher, the basic sequence may be defined by Equation 3.

$$b_{u,v}(n)=x_q(n \bmod N_{ZC}^{RS}), 0 \leq n < M_{sc}^{RS} \quad \text{[Equation 3]}$$

In Equation 3, q indicates a root index of a Zadoff-Chu (ZC) sequence. $N_{ZC}^{RS}$ is the length of the ZC sequence and may be a maximum prime number smaller than $M_{sc}^{RS}$. The ZC sequence having the root index q may be defined by Equation 4.

$$x_q(m) = e^{-j\frac{\pi q m(m+1)}{N_{ZC}^{RS}}}, 0 \leq m \leq N_{ZC}^{RS}-1 \quad \text{[Equation 4]}$$

q may be given by Equation 5.

$$q=\lfloor \bar{q}+1/2 \rfloor + v \cdot (-1)^{\lfloor 2\bar{q} \rfloor}$$

$$\bar{q}=N_{ZC}^{RS} \cdot (u+1)/31 \quad \text{[Equation 5]}$$

If the length of the reference signal sequence is $3N_{sc}^{RB}$ or less, the basic sequence may be defined by Equation 6.

$$b_{u,v}(n)=e^{j\phi(n)\pi/4}, 0 \leq n \leq M_{sc}^{RS}-1 \quad \text{[Equation 6]}$$

Table 1 is an example where $\varphi(n)$ is defined when $M_{sc}^{RS}=N_{sc}^{RB}$.

TABLE 1

| | $\varphi(0), \ldots, \varphi(11)$ | | | | | | | | | | |
|---|---|---|---|---|---|---|---|---|---|---|---|
| 0 | -1 | 1 | 3 | -3 | 3 | 3 | 1 | 1 | 3 | 1 | -3 | 3 |
| 1 | 1 | 1 | 3 | 3 | 3 | -1 | 1 | -3 | -3 | 1 | -3 | 3 |
| 2 | 1 | 1 | -3 | -3 | -3 | -1 | -3 | -3 | 1 | -3 | 1 | -1 |
| 3 | -1 | 1 | 1 | 1 | 1 | -1 | -3 | -3 | 1 | -3 | 3 | -1 |
| 4 | -1 | 3 | 1 | -1 | 1 | -1 | -3 | -1 | 1 | -1 | 1 | 3 |
| 5 | 1 | -3 | 3 | -1 | -1 | 1 | 1 | -1 | -1 | 3 | -3 | 1 |
| 6 | -1 | 3 | -3 | -3 | -3 | 3 | 1 | -1 | 3 | 3 | -3 | 1 |
| 7 | -3 | -1 | -1 | -1 | 1 | -3 | 3 | -1 | 1 | -3 | 3 | 1 |
| 8 | 1 | -3 | 3 | 1 | -1 | -1 | -1 | 1 | 1 | 3 | -1 | 1 |
| 9 | 1 | -3 | -1 | 3 | 3 | -1 | -3 | 1 | 1 | 1 | 1 | 1 |
| 10 | -1 | 3 | -1 | 1 | 1 | -3 | -3 | -1 | -3 | -3 | 3 | -1 |
| 11 | 3 | 1 | -1 | -1 | 3 | 3 | -3 | 1 | 3 | 1 | 3 | 3 |
| 12 | 1 | -3 | 1 | 1 | -3 | 1 | 1 | 1 | -3 | -3 | -3 | 1 |
| 13 | 3 | 3 | -3 | 3 | -3 | 1 | 1 | 3 | -1 | -3 | 3 | 3 |
| 14 | -3 | 1 | -1 | -3 | -1 | 3 | 1 | 3 | 3 | 3 | -1 | 1 |
| 15 | 3 | -1 | 1 | -3 | -1 | -1 | 1 | 1 | 3 | 1 | -1 | -3 |
| 16 | 1 | 3 | 1 | -1 | 1 | 3 | 3 | 3 | -1 | -1 | 3 | -1 |
| 17 | -3 | 1 | 1 | 3 | -3 | 3 | -3 | -3 | 3 | 1 | 3 | -1 |
| 18 | -3 | 3 | 1 | 1 | -3 | 1 | -3 | -3 | -1 | -1 | 1 | -3 |
| 19 | -1 | 3 | 1 | 3 | 1 | -1 | -1 | 3 | -3 | -1 | -3 | -1 |
| 20 | -1 | -3 | 1 | 1 | 1 | 1 | 3 | 1 | -1 | 1 | -3 | -1 |
| 21 | -1 | 3 | -1 | 1 | -3 | -3 | -3 | -3 | -3 | 1 | -1 | -3 |
| 22 | 1 | 1 | -3 | -3 | -3 | -3 | -1 | 3 | -3 | 1 | -3 | 3 |
| 23 | 1 | 1 | -1 | -3 | -1 | -3 | 1 | -1 | 1 | 3 | -1 | 1 |
| 24 | 1 | 1 | 3 | 1 | 3 | 3 | -1 | 1 | -1 | -3 | -3 | 1 |
| 25 | 1 | -3 | 3 | 3 | 1 | 3 | 3 | 1 | -3 | -1 | -1 | 3 |
| 26 | 1 | 3 | -3 | -3 | 3 | -3 | 1 | -1 | -1 | 3 | -1 | -3 |
| 27 | -3 | -1 | -3 | -1 | -3 | 3 | 1 | -1 | 1 | 3 | -3 | -3 |
| 28 | -1 | 3 | -3 | 3 | -1 | 3 | 3 | -3 | 3 | 3 | -1 | -1 |
| 29 | 3 | -3 | -3 | -1 | -1 | -3 | -1 | 3 | -3 | 3 | 1 | -1 |

Table 2 is an example where $\varphi(n)$ is defined when $M_{sc}^{RS}=2*N_{sc}^{RB}$.

TABLE 2

| | $\varphi(0), \ldots, \varphi(23)$ | | | | | | | | | | | | | | | | | | | | | | | |
|---|---|---|---|---|---|---|---|---|---|---|---|---|---|---|---|---|---|---|---|---|---|---|---|---|
| 0 | -1 | 3 | 1 | -3 | 3 | -1 | 1 | 3 | -3 | 3 | 1 | 3 | -3 | 3 | 1 | 1 | -1 | 1 | 3 | -3 | 3 | -3 | -1 | -3 |
| 1 | -3 | 3 | -3 | -3 | -3 | 1 | -3 | -3 | 3 | -1 | 1 | 1 | 1 | 3 | 1 | -1 | 3 | -3 | -3 | 1 | 3 | 1 | 1 | -3 |
| 2 | 3 | -1 | 3 | 3 | 1 | 1 | -3 | 3 | 3 | 3 | 3 | 1 | -1 | 3 | -1 | 1 | 1 | -1 | -3 | -1 | -1 | 1 | 3 | 3 |
| 3 | -1 | -3 | 1 | 1 | 3 | -3 | 1 | 1 | -3 | -1 | -1 | 1 | 3 | 1 | 3 | 1 | -1 | 3 | 1 | 1 | -3 | -1 | -3 | -1 |
| 4 | -1 | -1 | -1 | -3 | -3 | -1 | 1 | 1 | 3 | 3 | -1 | 3 | -1 | 1 | -1 | -3 | 1 | -1 | -3 | -3 | 1 | -3 | -1 | -1 |
| 5 | -3 | 1 | 1 | 3 | -1 | 1 | 3 | 1 | -3 | 1 | -3 | 1 | 1 | -1 | -1 | 3 | -1 | -3 | 3 | -3 | -3 | -3 | 1 | 1 |
| 6 | 1 | 1 | -1 | -1 | 3 | -3 | -3 | 3 | -3 | 1 | -1 | -1 | 1 | -1 | 1 | 1 | -1 | -3 | -1 | 1 | -1 | 3 | -1 | -3 |
| 7 | -3 | 3 | 3 | -1 | -1 | -3 | -1 | 3 | 1 | 3 | 1 | 3 | 1 | 1 | -1 | 3 | 1 | -1 | 1 | 3 | -3 | -1 | -1 | 1 |
| 8 | -3 | 1 | 3 | -3 | 1 | -1 | -3 | 3 | -3 | 3 | -1 | -1 | -1 | -1 | 1 | -3 | -3 | -3 | 1 | -3 | -3 | -3 | 1 | -3 |
| 9 | 1 | 1 | -3 | 3 | 3 | -1 | -3 | -1 | 3 | -3 | 3 | 3 | 3 | -1 | 1 | 1 | -3 | 1 | -1 | 1 | 1 | -3 | 1 | 1 |
| 10 | -1 | 1 | -3 | -3 | 3 | -1 | 3 | -1 | -1 | -3 | -3 | -3 | -1 | -3 | -3 | 1 | -1 | 1 | 3 | 3 | -1 | 1 | -1 | 3 |
| 11 | 1 | 3 | 3 | -3 | -3 | 1 | 3 | 1 | -1 | -3 | -3 | -3 | 3 | 3 | -3 | 3 | 3 | -1 | -3 | 3 | -1 | 1 | -3 | 1 |
| 12 | 1 | 3 | 3 | 1 | 1 | 1 | -1 | -1 | 1 | -3 | 3 | -1 | 1 | 1 | -3 | 3 | 3 | -1 | -3 | 3 | -3 | -1 | -3 | -1 |
| 13 | 3 | -1 | -1 | -1 | -1 | -3 | -1 | 3 | 3 | 1 | -1 | 1 | 3 | 3 | -1 | 1 | 1 | -3 | 1 | 3 | 1 | -3 | -3 | 3 |
| 14 | -3 | -3 | 3 | 1 | 3 | 1 | -3 | 3 | 1 | 3 | 1 | 1 | 3 | 3 | -1 | -1 | -3 | 1 | -3 | -1 | 3 | 1 | 1 | 3 |
| 15 | -1 | -1 | 1 | -3 | 1 | 3 | -3 | 1 | -1 | -3 | -1 | 3 | 1 | 3 | 1 | -1 | -3 | -3 | -1 | -1 | -3 | -3 | -3 | -1 |
| 16 | -1 | -3 | 3 | -1 | -1 | -1 | -1 | 1 | 1 | -3 | 3 | 1 | 3 | 3 | 1 | -1 | 1 | -3 | 1 | -3 | 1 | 1 | -3 | -1 |
| 17 | 1 | 3 | -1 | 3 | 3 | -1 | -3 | 1 | -1 | -3 | 3 | 3 | 3 | -1 | 1 | 1 | 3 | -1 | -3 | -1 | 3 | -1 | -1 | -1 |

TABLE 2-continued

| | $\varphi(0), \ldots, \varphi(23)$ | | | | | | | | | | | | | | | | | | | | | | | |
|---|---|---|---|---|---|---|---|---|---|---|---|---|---|---|---|---|---|---|---|---|---|---|---|---|
| 18 | 1 | 1 | 1 | 1 | 1 | -1 | 3 | -1 | -3 | 1 | 1 | 3 | -3 | 1 | -3 | -1 | 1 | 1 | -3 | -3 | 3 | 1 | 1 | -3 |
| 19 | 1 | 3 | 3 | 1 | -1 | -3 | 3 | -1 | 3 | 3 | 3 | -3 | 1 | -1 | 1 | -1 | -3 | -1 | 1 | 3 | -1 | 3 | -3 | -3 |
| 20 | -1 | -3 | 3 | -3 | -3 | -3 | -1 | -1 | -3 | -1 | -3 | 3 | 1 | 3 | -3 | -1 | 3 | -1 | 1 | -1 | 3 | -3 | 1 | -1 |
| 21 | -3 | -3 | 1 | 1 | -1 | 1 | -1 | 1 | -1 | 3 | 1 | -3 | -1 | 1 | -1 | 1 | -1 | -1 | 3 | 3 | -3 | -1 | 1 | -3 |
| 22 | -3 | -1 | -3 | 3 | 1 | -1 | -3 | -1 | -3 | -3 | 3 | -3 | 3 | -3 | -1 | 1 | 3 | 1 | -3 | 1 | 3 | 3 | -1 | -3 |
| 23 | -1 | -1 | -1 | -1 | 3 | 3 | 3 | 1 | 3 | 3 | -3 | 1 | 3 | -1 | 3 | -1 | 3 | 3 | -3 | 3 | 1 | -1 | 3 | 3 |
| 24 | 1 | -1 | 3 | 3 | -1 | -3 | 3 | -3 | -1 | -1 | 3 | -1 | 3 | -1 | -1 | 1 | 1 | 1 | -1 | -1 | -3 | -1 | 3 |
| 25 | 1 | -1 | 1 | -1 | 3 | -1 | 3 | 1 | 1 | -1 | -1 | -3 | 1 | 1 | -3 | 1 | 3 | -3 | 1 | 1 | -3 | -3 | -1 | -1 |
| 26 | -3 | -1 | 1 | 3 | 1 | 1 | -3 | -1 | -1 | -3 | 3 | -3 | 3 | 1 | -3 | 3 | -3 | 1 | -1 | 1 | -3 | 1 | 1 | 1 |
| 27 | -1 | -3 | 3 | 3 | 1 | 1 | 3 | -1 | -3 | -1 | -1 | -1 | 3 | 1 | -3 | -3 | -1 | 3 | -3 | -1 | -3 | -1 | -3 | -1 |
| 28 | -1 | -3 | -1 | -1 | 1 | -3 | -1 | -1 | 1 | -1 | -3 | 1 | 1 | -3 | 1 | -3 | -3 | 3 | 1 | 1 | -1 | 3 | -1 | -1 |
| 29 | 1 | 1 | -1 | -1 | -3 | -1 | 3 | -1 | 3 | -1 | 1 | 3 | 1 | -1 | 3 | 1 | 3 | -3 | -3 | 1 | -1 | -1 | 1 | 3 |

Hopping of a reference signal may be applied as follows.

The sequence group index u of a slot index ns may be defined based on a group hopping pattern $f_{gh}(n_s)$ and a sequence shift pattern $f_{ss}$ according to Equation 7.

$$u = (f_{gh}(n_s) + f_{ss}) \bmod 30 \quad \text{[Equation 7]}$$

17 different group hopping patterns and 30 different sequence shift patterns may exist. Whether to apply group hopping may be indicated by a higher layer.

A PUCCH and a PUSCH may have the same group hopping pattern. A group hopping pattern $f_{gh}(n_s)$ may be defined by Equation 8.

$$f_{gh}(n_s) = \begin{cases} 0 & \text{if group hopping is disabled} \\ \left(\sum_{i=0}^{7} c(8n_s + i) \cdot 2^i\right) \bmod 30 & \text{if group hopping is enabled} \end{cases} \quad \text{[Equation 8]}$$

In Equation 8, c(i) is a pseudo random sequence that is a PN sequence and may be defined by a Gold sequence of a length-31. Equation 9 shows an example of a gold sequence c(n).

$$c(n) = (x_1(n+N_c) + x_2(n+N_c)) \bmod 2$$

$$x_1(n+31) = (x_1(n+3) + x_1(n)) \bmod 2$$

$$x_2(n+31) = (x_2(n+3) + x_2(n+2) + x_1(n+1) + x_1(n)) \bmod 2 \quad \text{[Equation 9]}$$

Here, Nc=1600, $x_1(i)$ is a first m-sequence, and $x_2(i)$ is a second m-sequence. For example, the first m-sequence or the second m-sequence may be initialized according to a cell identifier (ID) for every OFDM symbol, a slot number within one radio frame, an OFDM symbol index within a slot, and the type of a CP. A pseudo random sequence generator may be initialized to $$c_{init} = \left\lfloor \frac{N_{ID}^{cell}}{30} \right\rfloor$$

in the first of each radio frame.

A PUCCH and a PUSCH may have the same sequence shift pattern. The sequence shift pattern of the PUCCH may be $f_{ss}^{PUCCH} = N_{ID}^{cell} \bmod 30$. The sequence shift pattern of the PUSCH may be $f_{ss}^{PUSCH} = (f_{ss}^{PUCCH} + \Delta_{ss}) \bmod 30$ and $\Delta_{ss} \in \{0, 1, \ldots, 29\}$ may be configured by a higher layer.

Sequence hopping may be applied to only a reference signal sequence having a length longer than $6N_{sc}^{RB}$. Here, a basic sequence index v within a basic sequence group of a slot index ns may be defined by Equation 10.

$$v = \begin{cases} c(n_s) & \text{if group hopping is disabled and sequence hopping is enabled} \\ 0 & \text{otherwise} \end{cases} \quad \text{[Equation 10]}$$

c(i) may be represented by an example of Equation 9. Whether to apply sequence hopping may be indicated by a higher layer. A pseudo random sequence generator may be initialized to $$c_{init} = \left\lfloor \frac{N_{ID}^{cell}}{30} \right\rfloor \cdot 2^5 + f_{ss}^{PUSCH}$$

in the first of each radio frame.

A DMRS sequence for a PUSCH may be defined by Equation 11.

$$r^{PUSCH}(m \cdot M_{sc}^{RS} + n) r_{u,v}^{(\alpha)}(n) \quad \text{[Equation 11]}$$

In Equation 11, m=0, 1, ... and n=0, ..., $M_{sc}^{RS}-1$. $M_{sc}^{RS} = M_{sc}^{PUSCH}$.

$\alpha = 2\pi n_{cs}/12$, that is, a cyclic shift value is given within a slot, and $n_{cs}$ may be defined by Equation 12.

$$n_{cs} = (n_{DMRS}^{(1)} + n_{DMRS}^{(2)} + n_{PRS}(n_s)) \bmod 12 \quad \text{[Equation 12]}$$

In Equation 12, $n_{DMRS}^{(1)}$ is indicated by a parameter transmitted by a higher layer, and Table 3 shows an example of a corresponding relationship between the parameter and $n_{DMRS}^{(1)}$.

TABLE 3

| Parameter | $n_{DMRS}^{(1)}$ |
|---|---|
| 0 | 0 |
| 1 | 2 |
| 2 | 3 |
| 3 | 4 |
| 4 | 6 |
| 5 | 8 |
| 6 | 9 |
| 7 | 10 |

Back in Equation 12, $n_{DMRS}^{(2)}$ may be defined by a cyclic shift field within a DCI format 0 for a transmission block corresponding to PUSCH transmission. The DCI format is transmitted in a PDCCH. The cyclic shift field may have a length of 3 bits.

Table 4 shows an example of a corresponding relationship between the cyclic shift field and $n_{DMRS}^{(2)}$.

TABLE 4

| Cyclic shift field in DCI format 0 | $n_{DMRS}^{(2)}$ |
|---|---|
| 000 | 0 |
| 001 | 6 |
| 010 | 3 |
| 011 | 4 |
| 100 | 2 |
| 101 | 8 |
| 110 | 10 |
| 111 | 9 |

If a PDCCH including the DCI format 0 is not transmitted in the same transmission block, if the first PUSCH is semi-persistently scheduled in the same transmission block, or if the first PUSCH is scheduled by a random access response grant in the same transmission block, $n_{DMRS}^{(2)}$ may be 0.

$n_{PRS}(n_s)$ may be defined by Equation 13.

$$n_{PRS}(n_s)=\Sigma_{i=0}^{7} c(8N_{symb}^{UL} \cdot n_s + i) \cdot 2^i \quad \text{[Equation 13]}$$

c(i) may be represented by the example of Equation 9 and may be applied in a cell-specific way of c(i). A pseudo random sequence generator may be initialized to $$c_{init} = \left\lfloor \frac{N_{ID}^{cell}}{30} \right\rfloor \cdot 2^5 + f_{ss}^{PUSCH}$$

in the first of each radio frame.

A DMRS sequence $r^{PUSCH}$ is multiplied by an amplitude scaling factor $\beta^{PUSCH}$ and mapped to a physical transmission block, used in relevant PUSCH transmission, from $r^{PUSCH}$(0) in a sequence starting. The DMRS sequence is mapped to a fourth OFDM symbol (OFDM symbol index 3) in case of a normal CP within one slot and mapped to a third OFDM symbol (OFDM symbol index 2) within one slot in case of an extended CP.

An SRS sequence $r_{SRS}(n)=r_{u,v}^{(\alpha)}(n)$ is defined. u indicates a PUCCH sequence group index, and v indicates a basic sequence index. The cyclic shift value $\alpha$ is defined by Equation 14.

$$\alpha = 2\pi \frac{n_{SRS}^{cs}}{8} \quad \text{[Equation 14]}$$

$n_{SRS}^{cs}$ is a value configured by a higher layer in related to each UE and may be any one of integers from 0 to 7.

Meanwhile, an orthogonal code cover (OCC) can be applied to a reference signal sequence. The OCC implies a code having orthogonality and applicable to a sequence. Although different sequences can be used to distinguish a plurality of channels in general, the OCC can be used to distinguish the plurality of channels.

The OCC can be used for the following purposes.

1) The OCC can be applied to increase an amount of radio resources allocated to an uplink reference signal.

For example, when a cyclic shift value of a reference signal transmitted in $1^{st}$ and $2^{nd}$ slots is assigned 'a', a minus sign (−) can be assigned to the reference signal transmitted in the $2^{nd}$ slot. That is, a $1^{st}$ user can transmit a reference signal having a cyclic shift value 'a' and assigned a plus sign (+) in the $2^{nd}$ slot, and a $2^{nd}$ user can transmit a reference signal having the cyclic shift value 'a' and assigned the minus sign (−) in the $2^{nd}$ slot. A BS can estimate a channel of the $1^{st}$ user by adding the reference signal transmitted in the $1^{st}$ slot and the reference signal transmitted in the $2^{nd}$ slot. Further, the BS can estimate a channel of the $2^{nd}$ user by subtracting the reference signal transmitted in the $2^{nd}$ slot from the reference signal transmitted in the $1^{st}$ slot. That is, by applying the OCC, the BS can distinguish the reference signal transmitted by the $1^{st}$ user and the reference signal transmitted by the $2^{nd}$ user. Accordingly, since at least two users use the same reference signal while using different OCCs, an amount of available radio resources can be increased by two-fold.

When transmitting an uplink reference signal by applying the OCC, a field for indicating the applied OCC can be allocated in a downlink control signal. For example, when it is assumed that an OCC indicator field is allocated with a 1-bit length in the downlink control signal, the OCC indicator can be expressed by Table 5.

TABLE 5

| | $1^{st}$ slot | $2^{nd}$ slot |
|---|---|---|
| 0 | 1 | 1 |
| 1 | 1 | −1 |

Referring to Table 5, when a value of the OCC indicator is 0, a plus sign (+) is applied to a reference signal transmitted in the $2^{nd}$ slot, and when the value of the OCC indicator is 1, a minus sign (−) is applied to a reference signal transmitted in the $2^{nd}$ slot.

2) The OCC can be applied to increase an interval of cyclic shift values allocated to multiple antennas or multiple layers of a single user. Although the cyclic shift values allocated to the multiple layers are described hereinafter, the present invention can also apply to the cyclic shift values allocated to the multiple antennas.

An uplink reference signal distinguishes a channel on the basis of a cyclic shift value. In a multi-antenna system, in order to distinguish a plurality of layers, different cyclic shift values can be allocated to reference signals of the respective layers. The cyclic shift value to be allocated must be increased in proportion to the number of layers, and thus an interval between cyclic shift values is decreased. Accordingly, it becomes difficult to distinguish the plurality of channels, thereby decreasing channel estimation capability. To overcome this problem, an OCC can be applied to each layer. For example, assume that cyclic shift offsets of reference signals for the layers are respectively allocated to 0, 6, 3, and 9 for four antennas. An interval of the cyclic shift values between the reference signals for the respective layers is 3. In this case, the interval of the cyclic shift values between the reference signals of the respective layers can be increased to 6 by applying an OCC with a minus sign (−) to $3^{rd}$ and $4^{th}$ layers. That is, when reference signal sequences with a length N and applied to a $1^{st}$ slot of $1^{st}$ to $4^{th}$ layers are respectively denoted by (S01, . . . , S0N), (S61, . . . , S6N), (S31, . . . , S3N), and (S91, . . . , S9N), reference signal sequences applied to a $2^{nd}$ slot of the $1^{st}$ to $4^{th}$ layers are respectively (S01, . . . , S0N), (S61, . . . , S6N), (−S31, . . . , −S3N), and (−S91, . . . , −S9N). When the reference signal sequences of the two slots are added, only reference signals of the $1^{st}$ and $2^{nd}$ layers remain, and thus an interval of cyclic shift values is 6. Likewise, when the reference signal sequences of the two slots are subtracted, only reference signals of the $3^{rd}$ and $4^{th}$ layers remain, and thus the interval of cyclic shift values is also 6. Accordingly, channel estimation capability can be increased.

Likewise, assume that cyclic shift offsets of reference signals for the layers are respectively allocated to 0, 6, and 3 for three layers. An interval of the cyclic shift values between the reference signals for the respective layers is 3. In this case, the interval of the cyclic shift values between the reference signals of the respective layers can be increased to 6 by applying an OCC with the minus sign (−) to a $3^{rd}$ layer. That is, when reference signal sequences with a length N and applied to a $1^{st}$ slot of $1^{st}$ to $3^{rd}$ layers are respectively denoted by (S01, . . . , S0N), (S61, . . . , S6N), and (S31, . . . , S3N), reference signal sequences applied to a $2^{nd}$ slot of the $1^4$ to $3^{rd}$ layers are respectively (S01, . . . , S0N), (S61, . . . , S6N), (−S31, . . . , −S3N). When the reference signal sequences of the two slots are added, only reference signals of the $1^{st}$ and $2^{nd}$ layers remain, and thus an interval of cyclic shift values is 6. Likewise, when the reference signal sequences of the two slots are subtracted, only a reference signal of the $3^{rd}$ layer remains. Accordingly, channel estimation capability can be increased.

3) The OCC can be applied to increase an interval of cyclic shift values allocated to a single user.

In a multi user-MIMO (MU-MIMO) system having multiple antennas and including a plurality of users, the OCC can be applied to a cyclic shift value. For example, from the perspective of the single user which performs MIMO transmission, in order to distinguish a plurality of antennas or a plurality of layers, a cyclic shift value having a great interval can be allocated between the respective antennas or the respective layers, whereas from the perspective of multiple users, a cyclic shift interval between the respective users can be decreased. To overcome this problem, the OCC can be applied. When the OCC is applied, the same cyclic shift value can be applied between multiple users according to an OCC type.

Table 6 shows an example of applying the OCC when there are four antennas or four layers.

TABLE 6

| | Types | | | | | | | |
|---|---|---|---|---|---|---|---|---|
| | Type 1 | | Type 2 | | Type 3 | | Type 4 | |
| Layer/Antenna | A | B | A | B | A | B | A | B |
| 1 | (1, 1) | (1, −1) | (1, 1) | (1, −1) | (1, 1) | (1, −1) | (1, 1) | (1, −1) |
| 2 | (1, 1) | (1, −1) | (1, 1) | (1, −1) | (1, −1) | (1, 1) | (1, −1) | (1, 1) |
| 3 | (1, 1) | (1, −1) | (1, −1) | (1, 1) | (1, 1) | (1, −1) | (1, −1) | (1, 1) |
| 4 | (1, 1) | (1, −1) | (1, −1) | (1, 1) | (1, −1) | (1, 1) | (1, 1) | (1, −1) |

In Table 6, (a,b) denotes an OCC applied to ($1^{st}$ slot, $2^{nd}$ slot) or ($2^{nd}$ slot, $1^{st}$ slot). A 1-bit OCC type field for indicating a type of applying the OCC can be added to a downlink control signal for indicating a cyclic shift value.

Table 7 shows an example of an OCC type field.

TABLE 7

| Codeword of OCC | Type |
|---|---|
| 0 | A (/B) |
| 1 | B (/A) |

In Table 7, if a value of the OCC type field is 0, the type A-(or type-B) OCC of Table 6 can be applied, and if the value of the OCC type field is 1, the type B-(or type-A) OCC of Table 6 can be applied.

Referring to the type 1-B of Table 6, the minus sign (−) is applied to all layers' or antennas' reference signals transmitted in any one slot. As such, when the OCC is applied, the OCC may be applied to some users and the OCC may not be applied to the other users. The OCC can be utilized as a resource, or can be used to increase an interval of cyclic shift values between multiple users.

Referring to the type 2-A of Table 6, the minus sign (−) is applied to some layers' or antennas' reference signals transmitted in any one slot. In the type 2-A, the minus sign (−) is applied to a reference signal of a $3^{rd}$ layer (or antenna) or a $4^{th}$ layer (or antenna). The OCC can be utilized as a resource, or can be used to increase an interval of cyclic shift values between multiple users.

Table 8 shows an example of applying the type-2 OCC of Table 6 to two users.

TABLE 8

| | $1^{st}$ Slot | $2^{nd}$ Slot |
|---|---|---|
| UE 1 | 0 6 3 9 | 0 6 −3 −9 |
| UE 2 | 4 10 | 4 10 |

The $1^{st}$ user transmits a reference signal with respect to four layers, and the $2^{nd}$ user transmits a reference signal with respect to two layers. The type 2-A OCC of Table 6 is applied to both the $1^{st}$ and $2^{nd}$ users. Accordingly, the minus sign (−) is applied to reference signals of $3^{rd}$ and $4^{th}$ layers of the $1^{st}$ user, and the minus sign (−) is not applied to reference signals of 1st and $2^{nd}$ layers of the $2^{nd}$ user.

Referring to the type 3-A of Table 6, the minus sign (−) is applied to some layers' or antennas' reference signals transmitted in any one slot. In the type 3-A, the minus sign (−) is applied to a reference signal of a $2^{nd}$ layer (or antenna) or a $4^{th}$ layer (or antenna). The OCC can be utilized as a resource, or can be used to increase an interval of cyclic shift values between multiple users.

Referring to the type 4-A of Table 6, the minus sign (−) is applied to some layers' or antennas' reference signals transmitted in any one slot. In the type 4-A, the minus sign (−) is applied to a reference signal of a $2^{nd}$ layer (or antenna) or a $3^{rd}$ layer (or antenna). The OCC can be utilized as a resource, or can be used to increase an interval of cyclic shift values between multiple users.

Hereinafter, the proposed reference signal transmission method will be described. According to the proposed reference signal transmission method, cyclic shift values for reference signals of a plurality of layers or a plurality of antennas can be applied variously. Although a case where the cyclic shift values are allocated to the reference signals of the plurality of layers is described hereinafter, the present invention is not limited thereto, and thus can also apply to a case where the cyclic shift values are allocated to the reference signals of the plurality of antennas.

First, cyclic shift values can constitute a set without considering the OCC, and thus can be allocated to reference signals of the plurality of layers.

The cyclic shift values can be allocated by considering a single user-MIMO (SU-MIMO) system. Due to a characteristic of a reference signal sequence used for uplink reference signal transmission of 3GPP LTE rel-8, a shift occurs in a time domain by a value corresponding to an allocated cyclic shift value. For example, if an FFT size is 512, when an interval of cyclic shift values is 1, the interval corresponds to 43 samples in a time domain. Meanwhile, a channel impulse response exists in a CP period in general. After receiving the channel impulse response existing in the CP period, it can be replaced with a frequency-domain signal to obtain an estimated channel. In case of multi-antenna transmission, a signal received from each antenna has a similar delay in general, and the channel impulse response may exist in the CP period or may be slightly deviated from the CP period. Therefore, by allocating a cyclic shift value having an interval equal to or greater than 1 or 2 in an SU-MIMO environment, a channel impulse response experienced by a signal transmitted from each antenna can be obtained sufficiently without interference between antennas. Accordingly, a minimum interval of cyclic shift values between respective layers is preferably equal to or greater than 1 in the SU-MIMO.

A set of cyclic shift values can be configured variously. For example, the set of cyclic shift values may be {0,2,3,4,6,8,9,10} which is a set of 8 cyclic shift values defined in 3GPP LTE rel-8. In a normal CP or extended CP, a cyclic shift value can be selected from the set. In addition, a subset of the set can be used. For example, a cyclic shift value can be selected from the subset consisting of {0,3,6,9}. When a channel has a long delay spread, a subset consisting of cyclic shift values having a great interval of the cyclic shift values can be used.

For another example, the set of cyclic shift values may be {0,1,2,3,4,5,6,7,8,9,10,11} which is a set of 12 cyclic shift values. In addition, a subset of the set can be used.

For another example, the set of cyclic shift values may be {0,4,8,2,6,10,3,9} which is a set of 8 cyclic shift values. In this case, in a cyclic shift value defined in 3GPP LTE rel-8, the cyclic shift value is selected such that cyclic shift values have an interval of 4, and if the cyclic shift value is greater than 12, the cyclic shift value is selected by performing a modulo operation. If there is a pre-selected value, a value closest to the selected value can be selected. If the set of cyclic shift values is a set of 12 cyclic shift values, the set may be {0,4,8,1,5,9,2,6,10}.

The cyclic shift set determined by using the aforementioned method can be indicated through a cyclic shift indicator allocated to a DCI format transmitted through a PDCCH. The cyclic shift indicator may have a length of 3 bits. By using a cyclic shift value indicated by the cyclic shift indicator as a start point of a cyclic shift set, and cyclic shift offsets can be allocated by the number of layers. That is, on the basis of the start point of the cyclic shift set and the cyclic shift offsets allocated to respective layers, cyclic shift values of the respective layers can be determined. An allocation order of the cyclic shift offsets may be sequential or may conform to a predetermined rule. The predetermined rule may be any sequence or may be an order based on an offset. The start point of the cyclic shift set indicated by the cyclic shift indicator may be any one of cyclic shift values allocated to the respective layers, or may be any one of cyclic shift offsets allocated to the respective layers. Alternatively, the start point may be the same value as $n_{DMRS}^{(2)}$.

For example, if a cyclic shift set is {0,2,3,4,6,8,9,10}, a cyclic shift indicator is 0, and the number of layers is 2, then starting from a cyclic shift value 0 in the cyclic shift set, cyclic shift values 0 and 2 can be selected as cyclic shift values of uplink reference signal sequences. Alternatively, if a cyclic shift set is {0,2,3,4,6,8,9,10}, a cyclic shift indicator is 0, the number of layers is 3, and cyclic shift offset values allocated to $1^{st}$ to $3^{rd}$ layers are respectively {0,6,3}, then cyclic shift values allocated to the $1^{st}$ to $3^{rd}$ layers may be respectively {0,6,3}.

In addition to the cyclic shift indicator, a selection offset can be additionally allocated in a DCI format. Starting from a cyclic shift value indicated by the cyclic shift indicator, cyclic shift values of reference signal sequences for a plurality layers can be allocated with an interval corresponding to a value indicated by the selection offset. The selection offset may have a length of 1 bit or two bits. If the selection offset has a length of 1, the selection offset may be any one of {1,2}, {1,3}, and {1,4}. If the selection offset has a length of 2, the selection offset may be any one of {1,2,3,4}. For example, if a cyclic shift indicator is 3 bits, a selection offset is 1 bit, a cyclic shift set consists of {0,2,3,4,6,8,9,10}, a cyclic shift indicator and a selection offset used by a $1^{st}$ user are respectively '000' and '0', and a cyclic shift indicator and a selection offset used by a $2^{nd}$ user are respectively '101' and '1', then cyclic shift values of reference signals of respective layers of the $1^{st}$ user may be {0,2}, and cyclic shift values of reference signals of respective layers of the $2^{nd}$ user may be {8,10}.

Meanwhile, if the number of layers is 3, two cyclic shift indicators can be allocated from the DCI format and thus can be used as cyclic shift values of reference signals of two layers, and a cyclic shift value of a reference signal of the remaining one layer can be allocated based on any one of the two cyclic shift indicators indicated by a PDCCH. In this case, the cyclic shift value of the reference signal of the remaining one layer can be implicitly determined based on a selection offset without additional signaling. Alternatively, the cyclic shift value of the reference signal of the remaining layer can be allocated based on any one of the two cyclic shift indicators.

The above description is also applied to a case where the number of layers is 4. Two cyclic shift indicators can be allocated from the DCI format and thus can be used as cyclic shift values of reference signals of two layers, and cyclic shift values of reference signals of the remaining two layers can be allocated based on the two cyclic shift indicators. For example, a cyclic shift value of a reference signal of a $3^{rd}$ layer can be based on a cyclic shift value of a reference signal of a $1^{st}$ layer, and a cyclic shift value of a reference signal of a $4^{th}$ layer can be based on a cyclic shift value of a reference signal of a $2^{nd}$ layer. The cyclic shift values of the reference signals of the remaining two layers can be implicitly determined based on a selection offset without additional signaling.

Although allocation of a cyclic shift value of an uplink DMRS has been described above by considering a plurality of layers, the present invention is not limited thereto, and thus can also apply to an uplink sounding reference signal. In this case, the present invention can apply specifically to an uplink sounding reference signal by varying a cyclic shift indicator allocated for the DMRS, and a cyclic shift set, etc. In addition, a signaling overhead can be prevented from occurring by directly applying the cyclic shift indicator for the DMRS or the cyclic shift value to the sounding reference signal.

Hereinafter, a method of allocating a cyclic shift value of a reference signal sequence of each layer by combining a cyclic shift index for indicating a cyclic shift value and an OCC index for indicating an OCC will be described. In this case, the cyclic shift value can be determined such that an interval of cyclic shift values of reference signals of respective layers is maximized. Alternatively, the cyclic shift value of the reference signals of the respective layers can be determined by using a cyclic shift indicator without additional signaling of the OCC index. In the following description, the cyclic shift index and the OCC index are described by using a table. In addition, although it is assumed that the number of layers is 4, when the number of layers is less than or equal to 4, it is also possible to use only cyclic shift values for some layers among cyclic shift values proposed in the corresponding table.

First, cyclic shift values can be allocated such that an interval of cyclic shift values of reference signals between $1^{st}$ and $2^{nd}$ layers and an interval of cyclic shift values of reference signals between $3^{rd}$ and $4^{th}$ layers are maximized. According to the applied OCC, only reference signals of the $1^{st}$ and $2^{nd}$ layers may remain and channel estimation may be performed in this state, and on the other hand, only reference signals of the $3^{rd}$ and $4^{th}$ layers may remain and channel estimation may be performed in this state.

Table 9 shows an example in which a cyclic shift index and an OCC index are mapped according to the proposed invention.

TABLE 9

| Index i (cyclic shift) | Cyclic Shift Field in DCI format 0 | $n_{DMRS}^{(2)}$ | OCC index |
|---|---|---|---|
| 0 | 000 | 0 | 0 |
| 1 | 001 | 6 | 0 |
| 2 | 010 | 3 | 1 |
| 3 | 011 | 4 | 1 |
| 4 | 100 | 2 | 0 |
| 5 | 101 | 8 | 0 |
| 6 | 110 | 10 | 1 |
| 7 | 111 | 9 | 1 |

According to Table 9, a cyclic shift index i and an OCC index are mapped. A cyclic shift field in DCI format 0 indicated by the cyclic shift index and $n_{DMRS}^{(2)}$ to be mapped to the cyclic shift field are mapped to the OCC index. That is, the same OCC index is always applied to the value $n_{DMRS}^{(2)}$. For example, if $n_{DMRS}^{(2)}=0$, the OCC index may be always 0, and if $n_{DMRS}^{(2)}=3$, the OCC index may be always 1. In this case, when the OCC index is 0, it implies that an OCC applied to $1^{st}$ and $2^{nd}$ slots are [1 1], and when the OCC is 1, it implies that an OCC applied to the $1^{st}$ and $2^{nd}$ slots are [1 −1]. Alternatively, the opposite is also applicable.

Table 10 shows a cyclic shift value of a reference signal of each layer applied according to Table 9.

TABLE 10

| Index i (cyclic shift) | Cyclic Shift Field in DCI format 0 [3] | $n_{DMRS}^{(2)}$ | Cyclic shift value of RS for rank-1 index | Cyclic shift value of RS for rank-2 index | Cyclic shift value of RS for rank-3 index | Cyclic shift value of RS for rank-4 index |
|---|---|---|---|---|---|---|
| 0 | 000 | 0 | 0 | 6 | −3 | −9 |
| 1 | 001 | 6 | 6 | 0 | −9 | −3 |
| 2 | 010 | 3 | −3 | −9 | 6 | 0 |
| 3 | 011 | 4 | −4 | −10 | 8 | 2 |
| 4 | 100 | 2 | 2 | 8 | 4 | 10 |
| 5 | 101 | 8 | 8 | 2 | −10 | −4 |
| 6 | 110 | 10 | −10 | −4 | 2 | 8 |
| 7 | 111 | 9 | −9 | −3 | 0 | 6 |

In Table 10, a minus sign (−) implies that an OCC index 1 is applied and thus the minus sign (−) is applied to a reference signal transmitted in a $2^{nd}$ slot. According to Table 10, cyclic shift values of reference signals of $1^{st}$ and $2^{nd}$ layers maintain a maximum interval, and likewise cyclic shift values of reference signals of $3^{rd}$ and $4^{th}$ layers also maintain a maximum interval. When the number of layers is 2 or 3, only some of cyclic shift values of Table 10 can be used.

Alternatively, the cyclic shift values of the reference signals of the respective layers can be allocated such that interference is reduced to the maximum extent possible in rank-2 transmission. Although an interval of the cyclic shift values of the reference signals of the respective layers is not maximized in rank-4 transmission, according to the applied OCC, only reference signals of the $1^{st}$ and $3^{rd}$ layers may remain and channel estimation may be performed in this state, and on the other hand, only reference signals of the $2^{nd}$ and $4^{th}$ layers may remain and channel estimation may be performed in this state.

Table 11 shows an example in which a cyclic shift index and an OCC index are mapped according to the proposed invention.

TABLE 11

| Index i (cyclic shift) | Cyclic Shift Field in DCI format 0 | $n_{DMRS}^{(2)}$ | OCC index |
|---|---|---|---|
| 0 | 000 | 0 | 0 |
| 1 | 001 | 6 | 1 |
| 2 | 010 | 3 | 0 |
| 3 | 011 | 4 | 1 |
| 4 | 100 | 2 | 0 |
| 5 | 101 | 8 | 1 |
| 6 | 110 | 10 | 0 |
| 7 | 111 | 9 | 1 |

Table 12 shows a cyclic shift value of a reference signal of each layer applied according to Table 10.

TABLE 12

| Index i (cyclic shift) | Cyclic Shift Field in DCI format 0 [3] | $n_{DMRS}^{(2)}$ | Cyclic shift value of RS for rank-1 index | Cyclic shift value of RS for rank-2 index | Cyclic shift value of RS for rank-3 index | Cyclic shift value of RS for rank-4 index |
|---|---|---|---|---|---|---|
| 0 | 000 | 0  | 0  | −6 | 3   | −9 |
| 1 | 001 | 6  | −6 | 0  | −9  | 3  |
| 2 | 010 | 3  | 3  | −9 | −6  | 0  |
| 3 | 011 | 4  | −4 | 10 | −8  | 2  |
| 4 | 100 | 2  | 2  | 8  | 4   | 10 |
| 5 | 101 | 8  | 8  | 2  | −10 | −4 |
| 6 | 110 | 10 | −10| −4 | 2   | 8  |
| 7 | 111 | 9  | −9 | −3 | 0   | 6  |

When the number of layers is 2 or 3, only some of cyclic shift values of Table 12 can be used.

According to the number of layers, it is also possible to allocate cyclic shift values based on different rules. For example, the cyclic shift values of Table 10 can be allocated in case of rank-2 transmission, and the cyclic shift values of Table 12 can be allocated in case of rank-4 transmission. Alternatively, the cyclic shift values of Table 12 can be allocated in case of rank-2 transmission, and the cyclic shift values of Table 10 can be allocated in case of rank-4 transmission.

The cyclic shift value can be allocated by combining a cyclic shift value and an OCC.

When the number of layers is 1, different cyclic shift values can be allocated according to a cyclic shift index. However, in case of a plurality of layers, the same cyclic shift value can be allocated even though cyclic shift indices are different. For example, any one of {0,6,3,4,2,8,10,9} can be used as a cyclic shift value of a reference signal of one layer, and any one of {(0,6),(6,0),(3,9),(4,10),(2,8),(8,2),(10,4),(9,3)} can be used as cyclic shift values of reference signals of two layers. In this case, (0,6)-(6,0)/(3,9)-(9,3)/(4,10)-(10,4)/(2,8)-(8,2) have the same cyclic shift value even though cyclic shift indices are different. Accordingly, in this case, the OCC can be applied to maintain orthogonality. For example, the OCC can be applied such as (0,6),(−6,−0). In this case, if a minus sign (−) is applied to reference signals of $1^{st}$ and $2^{nd}$ layers, a plus sign (+) can be applied to reference signals of $3^{rd}$ and $4^{th}$ layers.

Table 13 shows an example of a cyclic shift value of a reference signal of each layer according to the proposed invention.

TABLE 13

| Index i(cyclic shift) | Cyclic Shift Field in DCI format 0 [3] | $n_{DMRS}^{(2)}$ | Cyclic shift value of RS for rank-1 index | Cyclic shift value of RS for rank-2 index | Cyclic shift value of RS for rank-3 index | Cyclic shift value of RS for rank-4 index |
|---|---|---|---|---|---|---|
| 0 | 000 | 0  | 0  | 6   | −3  | −9 |
| 1 | 001 | 6  | −6 | −0  | 9   | 3  |
| 2 | 010 | 3  | 3  | 9   | −6  | −0 |
| 3 | 011 | 4  | −4 | −10 | 8   | 2  |
| 4 | 100 | 2  | −2 | −8  | 4   | 10 |
| 5 | 101 | 8  | 8  | 2   | −10 | 4  |
| 6 | 110 | 10 | 10 | 4   | −2  | −8 |
| 7 | 111 | 9  | −9 | −3  | 0   | 6  |

Table 14 shows another example of a cyclic shift value of a reference signal of each layer according to the proposed invention.

TABLE 14

| Index i(cyclic shift) | Cyclic Shift Field in DCI format 0 [3] | $n_{DMRS}^{(2)}$ | Cyclic shift value of RS for rank-1 index | Cyclic shift value of RS for rank-2 index | Cyclic shift value of RS for rank-3 index | Cyclic shift value of RS for rank-4 index |
|---|---|---|---|---|---|---|
| 0 | 000 | 0  | 0  | 6  | 3  | 9  |
| 1 | 001 | 6  | 6  | 0  | 9  | 3  |
| 2 | 010 | 3  | 3  | 9  | 6  | 0  |
| 3 | 011 | 4  | 4  | 10 | 7  | 1  |
| 4 | 100 | 2  | 2  | 8  | 5  | 11 |
| 5 | 101 | 8  | 8  | 1  | 11 | 4  |
| 6 | 110 | 10 | 10 | 4  | 1  | 7  |
| 7 | 111 | 9  | 9  | 3  | 0  | 6  |

Table 15 shows an example of applying the OCC to the reference signal of the 3$^{rd}$ and 4$^{th}$ layers of Table 14.

TABLE 15

| Index i(cyclic shift) | Cyclic Shift Field in DCI format 0 [3] | $n_{DMRS}^{(2)}$ | Cyclic shift value of RS for rank-1 index | Cyclic shift value of RS for rank-2 index | Cyclic shift value of RS for rank-3 index | Cyclic shift value of RS for rank-4 index |
|---|---|---|---|---|---|---|
| 0 | 000 | 0 | 0 | 6 | −3 | −9 |
| 1 | 001 | 6 | 6 | 0 | −9 | 3 |
| 2 | 010 | 3 | 3 | 9 | −6 | −0 |
| 3 | 011 | 4 | 4 | 10 | −7 | −1 |
| 4 | 100 | 2 | 2 | 8 | −5 | −11 |
| 5 | 101 | 8 | 8 | 1 | −11 | −4 |
| 6 | 110 | 10 | 10 | 4 | −1 | −7 |
| 7 | 111 | 9 | 9 | 3 | −0 | −6 |

Table 16 shows an example of applying the OCC to the reference signal of the 1$^{st}$ layer of Table 14.

TABLE 16

| Index i(cyclic shift) | Cyclic Shift Field in DCI format 0 [3] | $n_{DMRS}^{(2)}$ | Cyclic shift value of RS for rank-1 index | Cyclic shift value of RS for rank-2 index | Cyclic shift value of RS for rank-3 index | Cyclic shift value of RS for rank-4 index |
|---|---|---|---|---|---|---|
| 0 | 000 | 0 | 0 | 6 | −3 | −9 |
| 1 | 001 | 6 | −6 | −0 | 9 | 3 |
| 2 | 010 | 3 | 3 | 9 | −6 | −0 |
| 3 | 011 | 4 | −4 | −10 | 7 | 1 |
| 4 | 100 | 2 | −2 | −8 | 5 | 11 |
| 5 | 101 | 8 | 8 | 1 | −11 | −4 |
| 6 | 110 | 10 | 10 | 4 | −1 | −7 |
| 7 | 111 | 9 | −9 | −3 | 0 | 6 |

When the number of layers is less than or equal to 4, only cyclic shift values of reference signals of some layers may be allocated among the cyclic shift values of Table 13 to Table 16.

Figure 13:
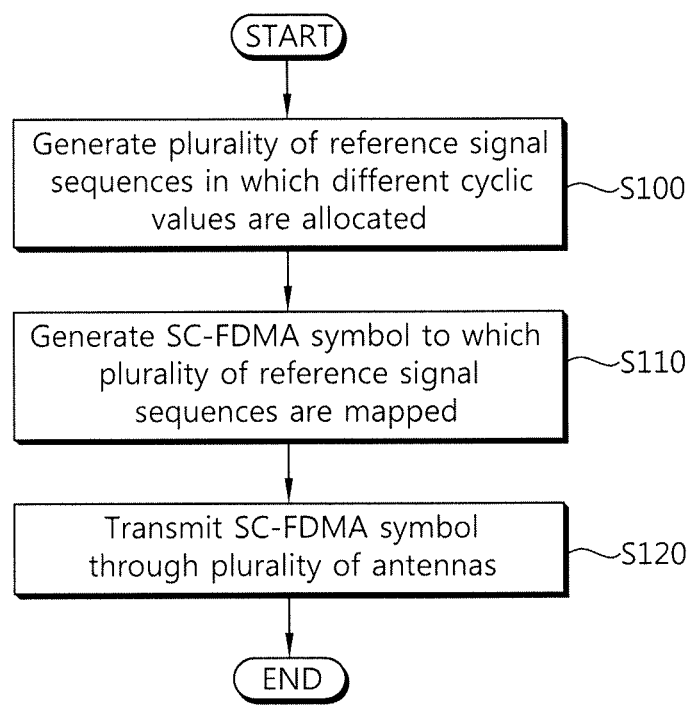
FIG. 13 is a block diagram showing an embodiment of the proposed reference signal transmission method.

FIG. 13 is a block diagram showing an embodiment of the proposed reference signal transmission method.

In step S100, a UE generates a plurality of reference signal sequences in which different cyclic shift values are allocated respectively to a plurality of layers. In step S110, the UE generates an SC-FDMA symbol to which the plurality of reference signal sequences are mapped. In step S120, the UE transmits the SC-FDMA symbol through a plurality of antennas. The cyclic shift values allocated to the respective layers can be determined based on a 1$^{st}$ cyclic shift value which is a cyclic shift value allocated to a 1$^{st}$ layer among the plurality of layers and different cyclic shift offsets allocated to the respective layers.

Figure 14:
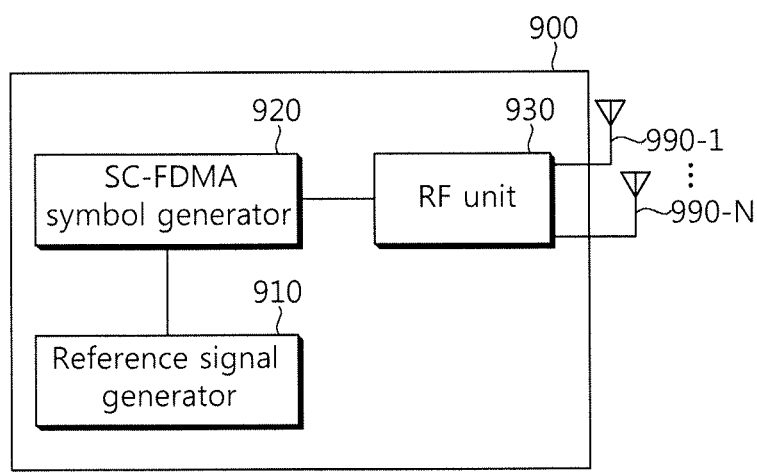
FIG. 14 is a block diagram of a UE according to an embodiment of the present invention.

FIG. 14 is a block diagram of a UE according to an embodiment of the present invention.

A UE 900 includes a reference signal generator 910, an SC-FDMA symbol generator 920, and a radio frequency (RF) unit 930. The reference signal generator 910 generates a plurality of reference signal sequences in which different cyclic shift values are allocated respectively to a plurality of layers. The SC-FDMA symbol generator 920 is connected to the reference signal generator and generates an SC-FDMA symbol to which the plurality of reference signal sequences are mapped. The RF unit 930 is connected to the SC-FDMA symbol generator and transmits the SC-FDMA symbol to a BS through a plurality of antennas.

The exemplary embodiments of the present invention may be implemented by hardware, software, or a combination thereof. The hardware may be implemented by an application specific integrated circuit (ASIC), digital signal processing (DSP), a programmable logic device (PLD), a field programmable gate array (FPGA), a processor, a controller, a microprocessor, other electronic units, or a combination thereof, all of which are designed so as to perform the above-mentioned functions. The software may be implemented by a module performing the above-mentioned functions. The software may be stored in a memory unit and may be executed by a processor. The memory unit or a processor may adopt various units well-known to those skilled in the art.

In the above-mentioned exemplary embodiments, the methods are described based on the series of steps or the flow charts shown by a block, but the exemplary embodiments of the present invention are not limited to the order of the steps and any steps may be performed in order different from the above-mentioned steps or simultaneously. In addition, a person skilled in the art to which the present invention pertains may understand that steps shown in the flow chart are not exclusive and thus, may include other steps or one or more step of the flow chart may be deleted without affecting the scope of the present invention.

The above-mentioned embodiments include examples of various aspects. Although all possible combinations showing various aspects are not described, it may be appreciated by those skilled in the art that other combinations may be made. Therefore, the present invention should be construed as including all other substitutions, alterations and modifications belonging to the following claims.

What is claimed is:

1. A method for transmitting demodulation reference signals (DMRSs), by a user equipment (UE), in a wireless communication system, the method comprising:

receiving, by the UE from a base station, a cyclic shift field in downlink control information (DCI), wherein the cyclic shift field indicates first, second, and third cyclic shift values for first, second, and third layers respectively, by table below:

| Cyclic shift field | First cyclic shift value for first layer | Second cyclic shift value for second layer | Third cyclic shift value for third layer |
|---|---|---|---|
| 000 | 0 | 6 | 3 |
| 001 | 6 | 0 | 9 |
| 010 | 3 | 9 | 6 |
| 011 | 4 | 10 | 7 |
| 100 | 2 | 8 | 5 |
| 101 | 8 | 2 | 11 |
| 110 | 10 | 4 | 1 |
| 111 | 9 | 3 | 0 | generating, by the UE, first, second, and third DMRSs for the first, second, and third layers respectively, based on first, second, and third cyclic shifts respectively, wherein the first, second, and third cyclic shifts are determined based on the first, second, and third cyclic shift values respectively; and transmitting, by the UE to the base station, the first, second, and third DMRSs.

2. A user equipment (UE) in a wireless communication system, the UE comprising:

a memory;

a transceiver; and a processor, operably coupled to the memory and the transceiver, that:

controls the transceiver to receive, from a base station, a cyclic shift field in downlink control information (DCI), wherein the cyclic shift field indicates first, second, and third cyclic shift values for first, second, and third layers respectively, by table below:

| Cyclic shift field | First cyclic shift value for first layer | Second cyclic shift value for second layer | Third cyclic shift value for third layer |
|---|---|---|---|
| 000 | 0 | 6 | 3 |
| 001 | 6 | 0 | 9 |
| 010 | 3 | 9 | 6 |
| 011 | 4 | 10 | 7 |
| 100 | 2 | 8 | 5 |
| 101 | 8 | 2 | 11 |
| 110 | 10 | 4 | 1 |
| 111 | 9 | 3 | 0 | generates first, second, and third demodulation reference signals (DMRSs) for the first, second, and third layers respectively, based on first, second, and third cyclic shifts respectively, wherein the first, second, and third cyclic shifts are determined based on the first, second, and third cyclic shift values respectively, and controls the transceiver to transmit, to the base station, the first, second, and third DMRSs.

* * * * *